United States Patent
Frevert

(10) Patent No.: US 10,965,935 B2
(45) Date of Patent: *Mar. 30, 2021

(54) CALIBRATION SYSTEMS USABLE FOR DISTORTION CHARACTERIZATION IN CAMERAS

(71) Applicant: Waymo LLC, Mountain View, CA (US)

(72) Inventor: Benjamin Frevert, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/809,869

(22) Filed: Mar. 5, 2020

(65) Prior Publication Data

US 2020/0336733 A1  Oct. 22, 2020

Related U.S. Application Data

(63) Continuation of application No. 16/385,761, filed on Apr. 16, 2019, now Pat. No. 10,623,727.

(51) Int. Cl.
*H04N 17/00* (2006.01)
*G02B 5/08* (2006.01)
(Continued)

(52) U.S. Cl.
CPC ......... *H04N 17/002* (2013.01); *G02B 5/0808* (2013.01); *G02B 26/124* (2013.01); *H04N 5/2254* (2013.01)

(58) Field of Classification Search
CPC .. H04N 17/002; H04N 5/2254; G02B 5/0808; G02B 26/124
See application file for complete search history.

(56) References Cited

U.S. PATENT DOCUMENTS 6,437,823 B1  8/2002  Zhang
6,795,648 B1 * 9/2004  Ross ................... G03B 13/24
                                                    396/150
(Continued)

FOREIGN PATENT DOCUMENTS

JP    2018163111 A    10/2018
SU      553447 A1     4/1977

OTHER PUBLICATIONS

"Using Mirror Cameras for Estimating Depth"; Jens Amspang, et al.; CAIP '95 Proceedings, LNCS 970 (1995).
(Continued)

*Primary Examiner* — Steven Whitesell Gordon
(74) *Attorney, Agent, or Firm* — McDonnell Boehnen Hulbert & Berghoff LLP

(57) ABSTRACT

Example embodiments relate to calibration systems usable for distortion characterization in cameras. An example embodiment includes a calibration system. The calibration system includes a first calibration target that includes a first mirror, a plurality of fiducials positioned on or adjacent to the first mirror, and an indexing fiducial positioned on or adjacent to the first mirror. The calibration system also includes a second calibration target that includes one or more second mirrors and has an aperture defined therein. The first mirror and the one or more second mirrors are separated by a distance. The first mirror faces the one or more second mirrors. The indexing fiducial is visible through the aperture in the second calibration target. Reflections of the plurality of fiducials are visible through the aperture defined in the second calibration target. The reflections of the plurality of fiducials are iterated reflections.

20 Claims, 31 Drawing Sheets

(51) Int. Cl.
  *H04N 5/225* (2006.01)
  *G02B 26/12* (2006.01)

(56) References Cited

U.S. PATENT DOCUMENTS

| | | | |
|---|---|---|---|
| 8,152,389 B1* | 4/2012 | Lammens | F16M 13/022 |
| | | | 396/419 |
| 9,589,348 B1 | 3/2017 | Linde et al. | |
| 9,948,926 B2 | 4/2018 | Kang et al. | |
| 2002/0003965 A1 | 1/2002 | Landelle et al. | |
| 2004/0141063 A1* | 7/2004 | Maeda | G06T 7/85 |
| | | | 348/207.99 |
| 2007/0005293 A1 | 1/2007 | Maeda et al. | |
| 2008/0031514 A1 | 2/2008 | Kakinami | |
| 2008/0181488 A1 | 7/2008 | Ishii et al. | |
| 2010/0165116 A1 | 7/2010 | Hsieh et al. | |
| 2010/0235129 A1 | 9/2010 | Sharma et al. | |
| 2010/0252628 A1 | 10/2010 | Chung | |
| 2012/0147183 A1 | 6/2012 | Nishimura et al. | |
| 2012/0170922 A1 | 7/2012 | Shuster | |
| 2013/0120678 A1* | 5/2013 | Chao | G02F 1/01 |
| | | | 349/34 |
| 2014/0285676 A1 | 9/2014 | Barreto et al. | |
| 2015/0248584 A1 | 9/2015 | Greveson et al. | |
| 2015/0288951 A1 | 10/2015 | Mallet et al. | |
| 2015/0341618 A1 | 11/2015 | He et al. | |
| 2015/0369757 A1 | 12/2015 | Golubovic et al. | |
| 2016/0094840 A1 | 3/2016 | Warner | |
| 2016/0124431 A1 | 5/2016 | Kelso et al. | |
| 2017/0221226 A1 | 8/2017 | Shen et al. | |
| 2017/0280135 A1 | 9/2017 | Shroff et al. | |
| 2019/0104295 A1 | 4/2019 | Wendel et al. | |

OTHER PUBLICATIONS

"Simple Calibration of Non-overlapping Cameras with a Mirror"; Ram Krishan Kumar, et al.; IEEE Computer Society Conference on Computer Vision and Pattern Recognition (Jun. 2008).
"Measuring Bidirectional Texture Reflectance with a Kaleidoscope"; Jefferson Y. Han, et al.; ACM Transactions on Graphics 22(3):741-748 (Jul. 2003).
YouTube Video entitled "Robotics [Penn State]—4.1.13—How to Compute Intrinsics from Vanishing Points"; uploaded on Jun. 23, 2018; screenshots included; URL: https://www.youtube.com/watch?v=rpirGdPaFMw; retrieved on Sep. 28, 2017.
"Flexible and User-Centric Camera Calibration using Planar Fiducial Markers."; S. Daftry, et al.; Proceedings of the British Machine Vision Conference; pp. 19.1-19.13 (Jan. 2013).
"Survey of Optical Indoor Positioning Systems"; R. Mautz, et al.; 2011 IEEE International Conference on Indoor Positioning and Indoor Navigation (IPIN) (Sep. 21-23, 2011).
YouTube Video entitled "Our Road to Self-Driving Vehicles | Uber ATG"; uploaded on Sep. 19, 2017; screenshots included; URL: https://youtu.be/27OuOCeZmwI; retrieved on Sep. 28, 2017.
"Fiducial Marker Detection Using FPGAs"; Peter Samarin, et al. (Sep. 28, 2013).
"Digital Camera Calibration Methods: Considerations and Comparisons"; Fabio Remondino, et al.; ISPRS Commission V Symposium 'Image Engineering and Vision Metrology' (Nov. 2005).
"Camera Calibration Without Feature Extraction"; Luc Robert; Research Report RR-2204, INRIA (1994).
"Geometric Calibration of Digital Cameras Through Multi-View Rectification"; Luca Lucchese; Image and Video Computing (Jan. 14, 2005).
"On-line Calibration of Multiple LIDARs on a Mobile Vehicle Platform"; Chao Gao, et al.; 2010 IEEE International Conference on Robotics and Automation (ICRA) (May 3-7, 2010).
"Calibration of a PMD-Camera Using a Planar Calibration Pattern Together with a Multi-Camera Setup"; Ingo Schiller, et al. (Mar. 2012).
"Novel Method for Structured Light System Calibration"; Song Zhang, et al.; Selected Works of Song Zhang (Aug. 21, 2006).
"OCPAD—Occluded Checkerboard Pattern Detector"; Peter Fuersattel, et al.; 2016 IEEE Winter Conference on Applications on Computer Vision (WACV) (Mar. 7-10, 2016).
"Calibration Between Depth and Color Sensors for Commodity Depth Cameras"; Cha Zhang, et al. (Jul. 15, 2014).
"Extrinsic Calibration Between a Multi-Layer Lidar and a Camera"; Sergio Alberto Rodriguez Florez, et al.; IEEE International Conference on Multisensor Fusion and Integration for Intelligent Systems, MFI 2008, South Korea, pp. 214-219 (Aug. 2008).
"ROCHADE: Robust Checkerboard Advanced Detection for Camera Calibration"; Simon Placht, et al.; ECCV, Zurich, Switzerland, vol. 8692 (Sep. 2014).
"Self-identifying Patterns for Plane-based Camera Calibration"; Mark Flala, et al.; Machine Vision and Applications 19:209-216 (Aug. 3, 2007).
"Pan-tilt-zoom Camera Calibration and High-resolution Mosaic Generation"; Sudipta N. Sinha, et al.; Journal of Computer Vision and Image Understanding—Special Issue on Omnidirectional Vision and Camera Networks, vol. 103, Issue 3, pp. 170-183 (Sep. 2006).
"Camera Calibration with OpenCV"; OpenCV 2.4.13.6 documentation » OpenCV Tutorials » calib3d module. Camera calibration and 3D reconstruction; URL: https://docs.opencv.org/2.4/doc/tutorials/calib3d/camera_calibration/camera_calibration.html; retrieved on Apr. 27, 2018.
"Flexible Camera Calibration by Viewing a Plane From Unknown Orientations"; Zhenyou Zhang; The Proceedings of the Seventh IEEE International Conference on Computer Vision, 1999 (Sep. 20-27, 1999).
"Camera Calibration and 3D Reconstruction"; OpenCV 2.4.13.6 documentation » OpenCV API Reference » calib3d.camera Calibration and 3D Reconstruction; URL: https://docs.opencv.org/2.4/modules/calib3d/doc/camera_calibration_and_3d_reconstruction.html; retrieved on Apr. 27, 2018.
"A Combined Corner and Edge Detector"; Chris Harris, et al.; In Proc. of Fourth Alvey Vision Conference, pp. 147-151 (1988).
"Good Features to Track"; Jianbo Shi, et al.; IEEE Conference on Computer Vision and Pattern Recognition (CVPR94) Seattle (Jun. 1994).
"Feature Detection"; OpenCV 2.4.13.6 documentation » OpenCV API Reference » imgproc. Image Processing; URL: https://docs.opencv.org/2.4/modules/imgproc/doc/feature_detection.html; retrieved on Apr. 27, 2018.
"Subpixel Corners: Increasing accuracy"; Utkarsh Sinha; Al Shack; URL: http://aishack.in/tutorials/subpixel-corners-increasing-accuracy/; retrieved on Apr. 27, 2018.
"Subpixel Measurements Using a Moment-Based Edge Operator"; Edward P. Lyvers, et al.; IEEE Transactions on Pattern Analysis and Machine Intelligence, vol. 11, No. 12 (Dec. 1989).
"Subpixel Precision Corner Detection and Localization"; Robert M. Haralick, et al.; URL: http://haralick.org/conferences/Subpixel_Corner.pdf; retrieved on Apr. 27, 2018.
"A Fast Subpixel Edge Detection Method Using Sobel-Zernike Moments Operator"; Qu Ying-Dong, et al.; Image and Vision Computing 23, pp. 11-17 (2005).
"Recovering and Characterizing Image Features Using an Efficient Model Based Approach"; Thierry Blaszka, et al.; RR-2422, INRIA (1994).
YouTube video entitled "Assisted Camera Calibration"; URL: https://youtu.be/3SWX1iQRbsg; Uploaded by user BoofCV; Uploaded to YouTube on Jun. 5, 2016; Screenshots included.
"Precise Ellipse Estimation Without Contour Point Extraction"; Jean-Nicolas Ouellet, et al.; Machine Vision Applications, vol. 21, Issue 1, pp. 59-67 (Oct. 12, 2009).
"A Robust Hough Transform Algorithm for Determining the Radiation Centers of Circular and Rectangular Fields with Subpixel Accuracy"; Weiliang Du, et al.; Physics in Medicine & Biology, vol. 54, No. 3 (Jan. 6, 2009).
International Search Report and Written Opinion dated Mar. 4, 2019 issued in connection with International Application No. PCT/US2018/051690, filed on Sep. 19, 2018, 12 pages.

(56) References Cited

OTHER PUBLICATIONS

International Search Report and Written Opinion dated Jul. 21, 2020 issued in connection with International Application No. PCT/US2020/026322, filed on Apr. 2, 2020, 9 pages.
B. Atcheson et al., "CALTag: High Precision Fiducial Markers for Camera Calibration," Vision, Modeling, and Visualization (2010), pp. 1-8, Dec. 2010.

* cited by examiner

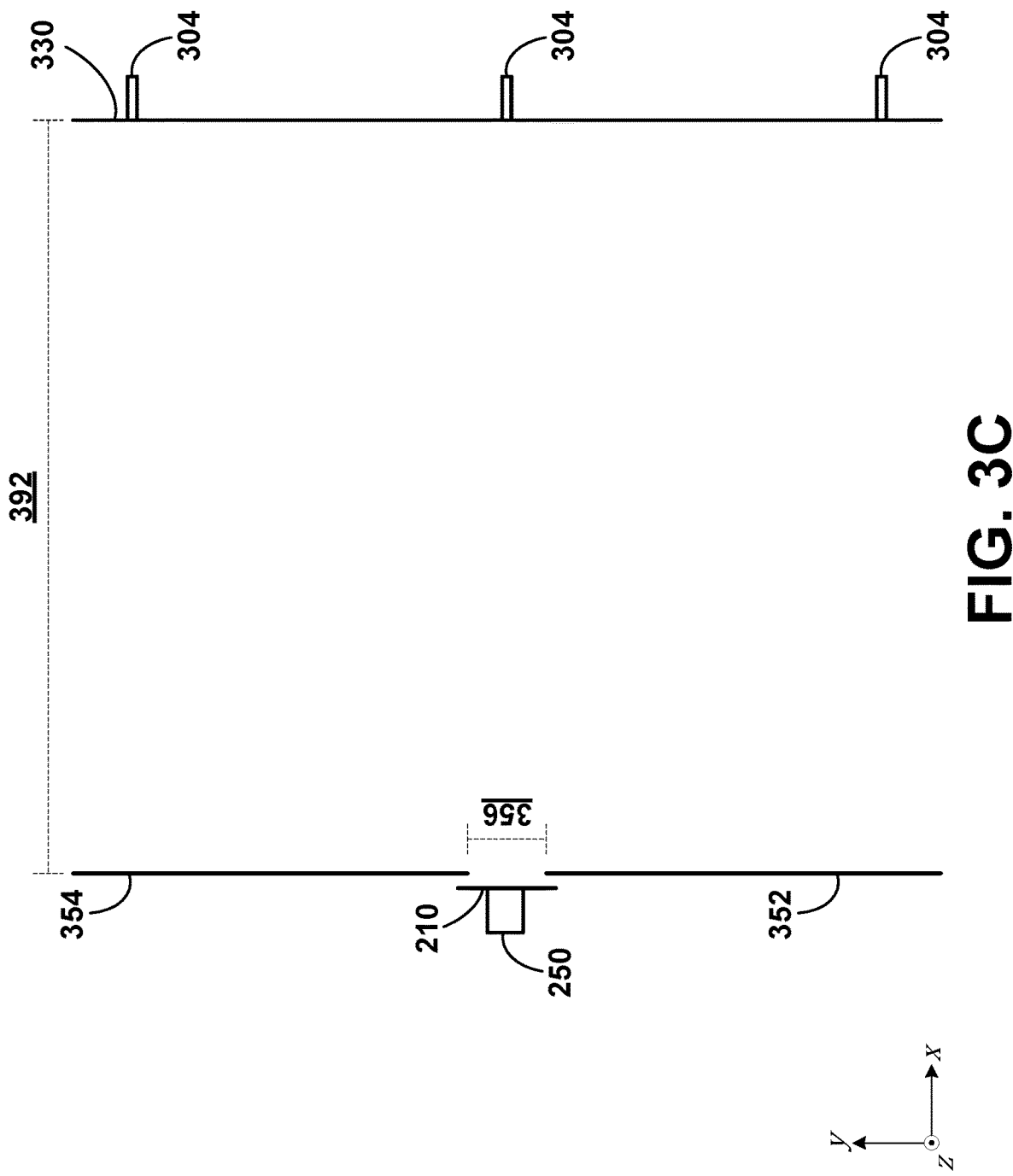

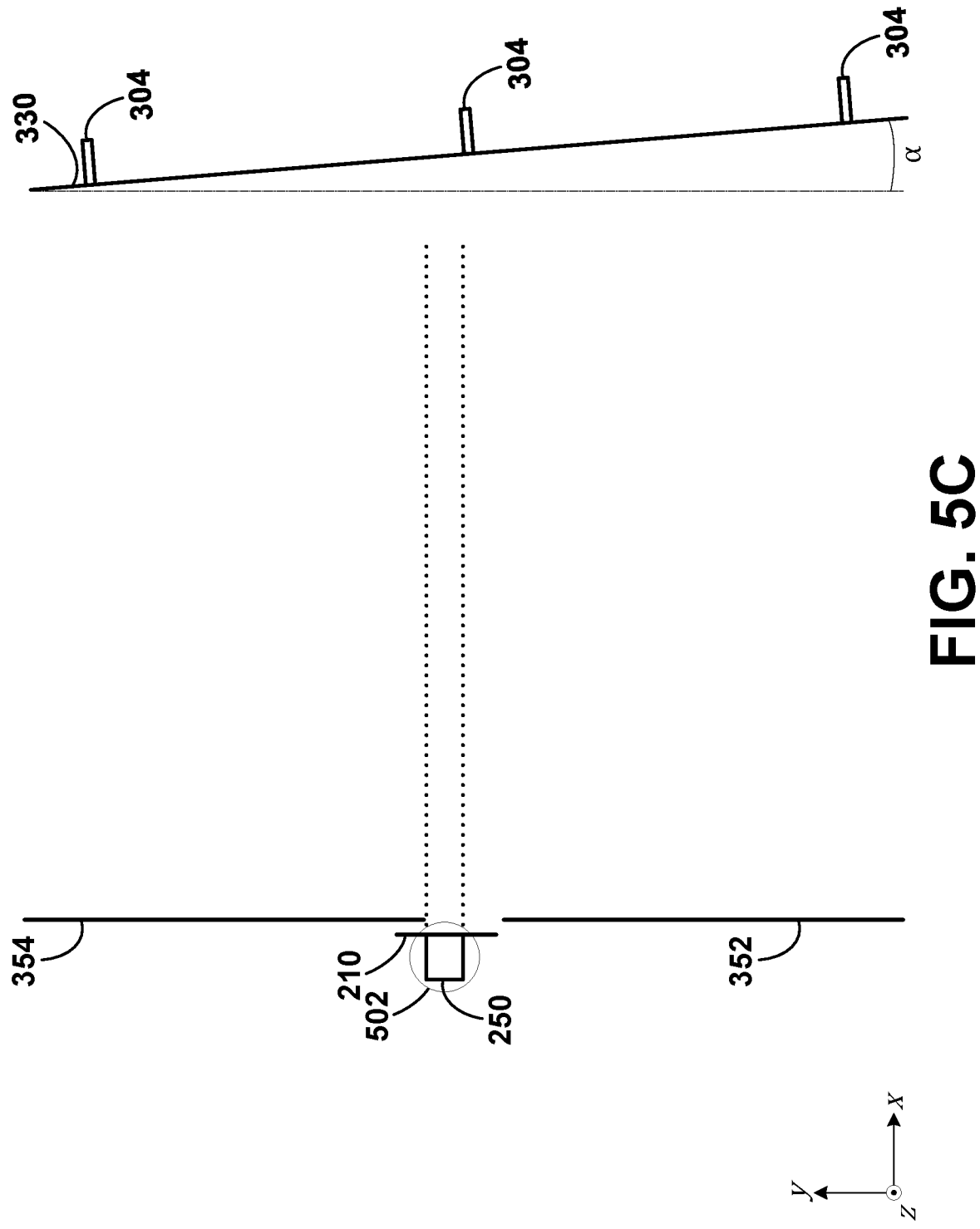

CALIBRATION SYSTEMS USABLE FOR DISTORTION CHARACTERIZATION IN CAMERAS

CROSS-REFERENCE TO RELATED APPLICATIONS

The present application is a continuation of U.S. patent application Ser. No. 16/385,761, filed with the U.S. Patent and Trademark Office on Apr. 16, 2019, the contents of which are hereby incorporated by reference.

BACKGROUND

Unless otherwise indicated herein, the materials described in this section are not prior art to the claims in this application and are not admitted to be prior art by inclusion in this section.

Cameras can be used to identify objects within a scene (e.g., in computer vision applications). However, to improve the precision with which a camera identifies objects within a scene, the camera may be calibrated. Such a calibration can provide a correlation of the appearance of a captured image to the spatial layout of a physical scene. Further, calibration can correct for defects in the fabrication and/or assembly of a camera used to capture images. For example, if an aperture of a camera is off-center with respect to an image sensor of the camera or a lens of the camera intrinsically distorts an image, a calibration may correct for this (e.g., using a processor that provides a correction to captured images such that they more accurately reflect a physical scene).

SUMMARY

The disclosure relates to methods for performing camera calibration. The camera calibration may be performed using a calibration system that includes two calibration targets facing each other and separated by a distance. One of the calibration targets (i.e., the first calibration target) may include a planar mirror and fiducials. The other calibration target (i.e., the second calibration target) may include one or more planar mirrors with an aperture defined therein. The camera being calibrated may be positioned behind the second calibration target and facing the first calibration target. The camera may view the first calibration target through the aperture of the second calibration target. Because the mirrors of the first and second calibration targets are facing each other, a set of iterated reflections may be generated between the calibration targets (e.g., similar to a hall of mirrors arrangement). The camera may capture an image of the iterated reflections via the aperture in the second calibration target. The image may then be used to calibrate the camera (e.g., both intrinsically and extrinsically).

In one aspect, a calibration system is provided. The calibration system includes a first calibration target. The first calibration target includes a first mirror. The first calibration target also includes a plurality of fiducials positioned on or adjacent to the first mirror. Further, the first calibration target includes an indexing fiducial positioned on or adjacent to the first mirror. The calibration system also includes a second calibration target that includes one or more second mirrors and has an aperture defined therein. The first calibration target and the second calibration target are positioned such that the first mirror and the one or more second mirrors are separated by a distance. The first calibration target and the second calibration target are also positioned such that the first mirror is facing the one or more second mirrors. Further, the first calibration target and the second calibration target are positioned such that the indexing fiducial is visible through the aperture defined in the second calibration target. In addition, the first calibration target and the second calibration target are positioned such that reflections of the plurality of fiducials are visible through the aperture defined in the second calibration target. The reflections of the plurality of fiducials are iterated reflections resulting from at least one reflection by the one or more second mirrors and at least one reflection by the first mirror.

In another aspect, a method is provided. The method includes positioning a first calibration target and a second calibration target such that a first mirror of the first calibration target and one or more second mirrors of the second calibration target are separated by a distance; the first mirror is facing the one or more second mirrors; an indexing fiducial positioned on or adjacent to the first mirror of the first calibration target is visible through an aperture defined in the second calibration target; and reflections of a plurality of fiducials positioned on or adjacent to the first mirror of the first calibration target are visible through the aperture defined in the second calibration target. The reflections of the plurality of fiducials are iterated reflections resulting from at least one reflection by the one or more second mirrors and at least one reflection by the first mirror. The method also includes positioning a camera behind the second calibration target such that it observes the first calibration target through the aperture defined in the second calibration target. Further, the method includes capturing a calibration image using the camera. In addition, the method includes characterizing, based on the calibration image, an intrinsic distortion of the camera.

In an additional aspect, a non-transitory, computer-readable medium having instructions stored thereon is provided. The instructions, when executed by a processor, cause the processor to execute a method. The method includes receiving a calibration image captured using a camera positioned behind a second calibration target to observe a first calibration target through an aperture defined in the second calibration target. The first calibration target includes a first mirror. The first calibration target also includes a plurality of fiducials positioned on or adjacent to the first mirror. Further, the first calibration target includes an indexing fiducial positioned on or adjacent to the first mirror. The second calibration target includes one or more second mirrors. The first calibration target and the second calibration target are positioned such that the first mirror and the one or more second mirrors are separated by a distance. The first calibration target and the second calibration target are also positioned such that the first mirror is facing the one or more second mirrors. Further, the first calibration target and the second calibration target are positioned such that the indexing fiducial is visible through the aperture defined in the second calibration target. In addition, the first calibration target and the second calibration target are positioned such that reflections of the plurality of fiducials are visible through the aperture defined in the second calibration target. The reflections of the plurality of fiducials are iterated reflections resulting from at least one reflection by the one or more second mirrors and at least one reflection by the first mirror. The method also includes characterizing, based on the calibration image, an intrinsic distortion of the camera.

These as well as other aspects, advantages, and alternatives will become apparent to those of ordinary skill in the art by reading the following detailed description, with reference, where appropriate, to the accompanying drawings.

BRIEF DESCRIPTION OF THE DRAWINGS

FIG. 3C is a top-view illustration of a calibration system, according to example embodiments.

FIG. 5C is a top-view illustration of a calibration system, according to example embodiments.

DETAILED DESCRIPTION

Figure 1:
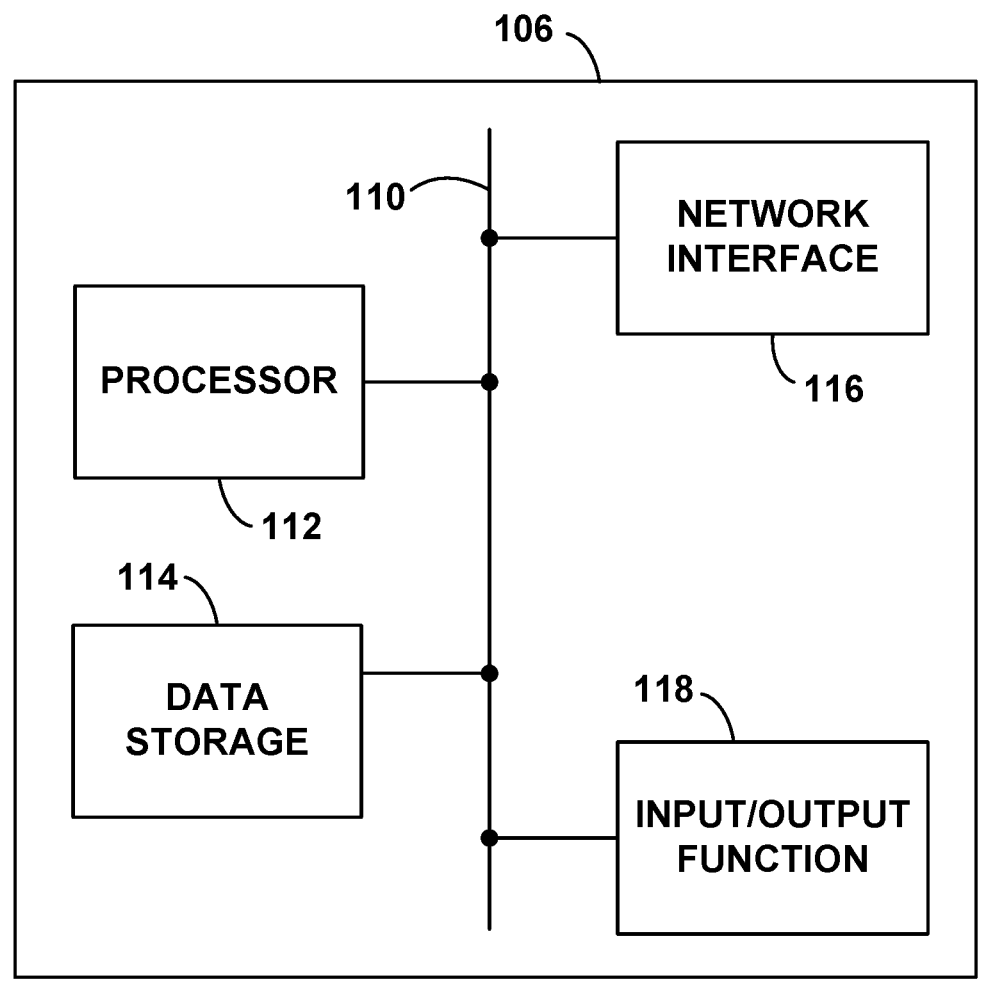
FIG. 1 is a schematic illustration of a computer device, according to example embodiments.

Example methods and systems are contemplated herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. Further, some of the illustrated elements may be combined or omitted. Yet further, an example embodiment may include elements that are not illustrated in the figures.

I. OVERVIEW

Computer vision involves a series of technologies used to capture data of surroundings and use the data to determine information about the surroundings. Computer vision may include analyzing images captured by a camera, for example. Further, computer vision may be used for object detection, identification, and/or avoidance. For instance, computer vision may be employed on a vehicle operating in an autonomous mode. In such an application, a camera may capture an image and, based upon the image, the vehicle operating in an autonomous mode may make control decisions (e.g., what speed to travel at, where to turn, when to stop, when to honk the horn, etc.).

In order to make appropriate inferences from captured images, calibrating the camera capturing the images can be important. Such a calibration can provide a correlation of the appearance of a captured image to the spatial layout of a physical scene. Further, calibration can correct for defects in the fabrication and/or assembly of a camera sensor/lens used to capture images. For example, if an aperture of a camera is off-center with respect to a camera sensor, a calibration may account for this (e.g., using a processor that provides a correction to captured images such that they more accurately reflect a physical scene).

One method of intrinsically calibrating cameras includes applying the pinhole camera model. The pinhole camera model assumes the camera being calibrated is an ideal pinhole camera (i.e., a camera with no lenses and a point-like aperture). Using the pinhole camera model approximation, the coordinates (e.g., in three-dimensions) of a physical scene may be mapped to a projection on a two-dimensional plane, where the projection on the two-dimensional plane is represented by a captured calibration image. The location of the pinhole aperture in the theoretical pinhole camera can be determined based on the calibration image. Other parameters of the theoretical pinhole camera can also be determined (e.g., focal length). If the location of the pinhole aperture is not centered with respect to the camera sensor, steps can be taken to account for the off-center location of the aperture. Determining the location of the pinhole aperture and accounting for it may include calculating one or more elements of a camera matrix based on one or more calibration images.

Other methods of calibration can be employed to correct for other defects inherent in optical design or due to fabrication/assembly, as well. For example, one or more distortion coefficients can be calculated based on a recorded calibration image. The distortion coefficient may be used to account for optical non-uniformities arising due to a lens in the camera (e.g., barrel distortions, mustache distortions, or pincushion distortions). In addition, other optical aberrations can be accounted for using calibration (e.g., defocusing, tilting, spherical aberrations, astigmatism, coma, or chromatic aberrations). The OpenCV library of functions contains multiple commands that can be used for calibrating cameras (e.g., cameras for use in computer vision applications).

In traditional camera calibration techniques, intrinsic camera calibration is performed using a calibration target (e.g., a checkerboard calibration target). However, for cameras having lenses with long focal distances and/or to calibrate for objects that are to be captured at distant locations, the calibration target may be impractically large or require a calibration space that is impractically large. For example, to calibrate for an object that will be located at 100 m from the camera, in order for a reasonable portion of the field of view of the camera to be occupied by the calibration target during calibration, the calibration target may be the size of a building. Such a calibration target may be difficult to fabricate, position, assemble, etc. Further, it may be impractical to find an open space that allows for a 100 m separation between the camera to be calibrated and the calibration target.

Example embodiments herein relate to methods and targets that can be used to perform intrinsic camera calibration. Some embodiments disclosed herein relate to a calibration system that is similar to a hall of mirrors. By employing multiple iterated reflections, the problem described above regarding large calibration targets positioned at large distances from the camera to be calibrated can be avoided. For example, some embodiments include multiple mirrors that face one another to generate a series of reflections. Adjacent to one of the mirrors is a spatial filter. The spatial filter may include a series of fiducials (e.g., line fiducials and/or point fiducials) that are replicated via the series of reflections. Line fiducials may be used to identify a vanishing point within the converging reflections of a calibration image. Additional fiducials may be used to identify which order a respective reflection is within the calibration image (e.g., first order, second order, third order, etc.). Additionally, the spatial filter may include an additional fiducial (e.g., an unreflected fiducial) positioned so that it is not replicated in the series of reflections. This additional, unreflected fiducial may be used to identify which reflection is the zeroth-order reflection (i.e., which "reflection" is not a reflection at all, but instead a direct transmission to the lens of the camera to be calibrated).

The fiducials of the spatial filter may be illuminated (e.g., by a backlight) such that they are clearly defined in a calibration image. For example, the fiducials may be holes within a plane of the respective calibration target and may be illuminated from the back by an array of light-emitting diodes (LEDs) or other light sources. The light sources may be fabricated so that the fiducials are relatively uniform in intensity (e.g., the brightness of each region of each fiducial is within 1%, 3%, or 5% of the brightness of each other region in that fiducial and each region of each other fiducial). Further, recognizing that multiple colors may be captured by a camera (e.g., on multiple channels), and that chromatic aberration may occur, the light sources illuminating the fiducials may be modulated so that they sequentially provide a spectrum of colors (e.g., so chromatic aberrations may be identified and accounted for). For example, the light sources may first emit red light, then green light, and then blue light (e.g., one color corresponding to each channel captured by the camera). In such embodiments, three separate calibration images may be captured (one when red light is being emitted, one when green light is being emitted, and one when blue light is being emitted). In other embodiments, infrared light may be emitted by the light sources (e.g., if the camera being calibrated has an infrared channel). Other wavelengths are also possible (e.g., wavelength ranges that include at least one of a range of visible wavelengths or a range of infrared wavelengths).

The camera being calibrated may be positioned in between two mirrors on one side of the calibration arrangement. The camera may peer through the space between two mirrors at an opposing mirror on the opposite side of the calibration arrangement. In other embodiments, the camera may be positioned such that it peers through an aperture formed in a single mirror (rather than through a space defined between two mirrors) at the opposing mirror on the opposite side of the calibration arrangement. Regardless, the opposing mirror may be substantially parallel to the two mirrors (or single mirror) on the camera side of the arrangement (i.e., within 1°, 2°, 3°, 5°, or 10° of parallel). Further, the fiducials of the spatial filter (e.g., the lines and points) may be positioned adjacent to the opposing mirror such that the light from the illuminated fiducials is reflected from the two mirrors (or single mirror) flanking the camera and then reflected by the mirror adjacent to the fiducials. This second reflection may be partially directed to the camera lens and partially directed to the mirrors (or single mirror) flanking the camera where it is reflected for a third time, upon which the light is reflected for a fourth time off of the mirror adjacent to the fiducials. This process may continue, with each reflection of the fiducials converging to a vanishing point in the mirror opposite the camera. Hence, when a calibration image is captured by the camera, a series of reflections is captured by the camera, with each reflection being at a different apparent depth. Therefore, not only does the captured image provide a series of reflections by which to calculate distortion coefficients within the camera (e.g., based on the distortion of the camera lens), different imaging depths are also provided by the reflections. The series of reflections in the captured image can also be used to evaluate the depth of field for a given set of camera optics and camera settings (e.g., based on aperture size, exposure time, image sensor sensitivity, etc.).

Imaging depths for the reflections may be much greater than the physical separation of the two calibration targets (due to the iterated reflections). In this way, multiple depths can be calibrated by the camera without moving the calibration targets relative to one another. Further, the spatial efficiency of the calibration system may be superior to alternative calibration techniques, as a given imaging depth may be calibrated using an actual separation between the two calibration targets that is much less than the respective imaging depth (this is not necessarily the case in alternative calibration techniques). For example, in some alternative calibration techniques, it can be difficult to find an unoccluded space of a given size to perform a calibration of a desired imaging depth.

Additionally or alternatively, in some embodiments, the camera may be affixed to a mount. In such embodiments, in addition to the unreflected fiducial being positioned opposite the camera near the opposing mirror such that it is unreflected in the iterated reflections, the mount may include one or more camera-orientation fiducials near the camera (e.g., on the mount located above or below the camera lens). Using such a technique, the camera-orientation fiducials may undergo one reflection off of the opposing mirror. This reflection may be captured by the camera in the calibration image and be used to identify the orientation of the camera (e.g., if the camera is rigidly attached to the mount, the orientation of the camera-orientation fiducial on the mount relative to the fiducials in the spatial filter may be compared to identify the orientation of the camera relative to the spatial filter).

Even further, the mount may be configured to rotate in a yaw direction (e.g., using a first rotational stage) and/or a pitch direction (e.g., using a second rotational stage). The camera may rotate such that a series of combinations of yaw and pitch directions are used to capture a corresponding series of calibration images. Using the series of calibration images, a large portion or the entirety of the field of view of the camera can be calibrated, with different regions of the field of view being occupied by iterated reflections of fiducials in different combinations of yaw and pitch.

II. EXAMPLE SYSTEMS

The following description and accompanying drawings will elucidate features of various example embodiments. The embodiments provided are by way of example, and are not intended to be limiting. As such, the dimensions of the drawings are not necessarily to scale.

In some embodiments, one or more steps of a method (e.g., steps of a calibration of a camera) may be performed by a computing device. FIG. 1 illustrates an example computing device 106.

The computing device 106 may be used to calibrate a camera based on captured calibration images. In order to perform such a calibration, the computing device 106 may include a variety of components, as illustrated in FIG. 1. FIG. 1 is a simplified block diagram, illustrating some of the functional components that could be included in a computing device arranged to operate in accordance with the embodiments contemplated herein. Example computing device 106 could be a desktop computing device, laptop computing device, mobile computing device, tablet computing device, server computing device, or some other type of computing device, in various embodiments.

As illustrated in FIG. 1, the computing device 106 may include a processor 112, a data storage 114, a network interface 116, and an input/output function 118, all of which may be coupled by a system bus 110 or a similar mechanism. The processor 112 may include one or more central processing units (CPUs), such as one or more general purpose processors and/or one or more dedicated processors (e.g., application specific integrated circuits (ASICs), digital signal processors (DSPs), network processors, field-programmable gate arrays (FPGAs), etc.). In some embodiments, the computing device 106 may be located remotely from the camera being calibrated (e.g., the computing device 106 may be a cloud computing device or a networked computing device).

The data storage 114, in turn, may include volatile memory (e.g., random access memory (RAM)) and/or non-volatile memory (e.g., a hard drive, read-only memory (ROM), programmable read-only memory (PROM), erasable programmable read-only memory (EPROM), electrically erasable programmable read-only memory (EEPROM), non-volatile random-access memory (such as flash memory), a solid state drive (SSD), a hard disk drive (HDD), a compact disc (CD), a digital video disk (DVD), a digital tape, a read/write (RW) CD, an R/W DVD, etc.). As such, the data storage 114 may include a non-transitory, computer-readable medium. Further, the data storage 114 may be integrated in whole or in part with processor 112. In some embodiments, the data storage 114 may store program instructions, executable by the processor 112, and data that may be manipulated by these program instructions to carry out the various methods, processes, or operations contemplated herein. Alternatively, these methods, processes, or operations can be defined by hardware, firmware, and/or any combination of hardware, firmware, and software.

The network interface 116 may include one or more wireline connections, such as an Ethernet connection or a universal serial bus (USB) connection. Additionally or alternatively, the network interface 116 may include one or more wireless interfaces, such as IEEE 802.11 (WIFI®), BLUETOOTH®, BLUETOOTH LOW ENERGY (BLE®), cellular technology (e.g., global system for mobile communications (GSM), code-division multiple access (CDMA), universal mobile telecommunications system (UMTS), evolution-data optimized (EV-DO), worldwide interoperability for microwave access (WiMAX), or long-term evolution (LTE®)), dedicated short range communications (DSRC), communication protocols described in IEEE 802.15.4 (e.g., ZIGBEE®), or a wide-area wireless connection. Other forms of physical layer connections and other types of standard or proprietary communication protocols may be used over the network interface 116.

The input/output function 118 may facilitate user interaction with the computing device 106. The input/output function 118 may include multiple types of input devices, such as a keyboard, a mouse, a touch screen, etc. Similarly, the input/output function 118 may include multiple types of output devices, such as a screen, monitor, printer, one or more light-emitting diodes (LEDs), etc. Additionally or alternatively, the computing device 106 may support remote access from another device, via the network interface 116 or via another interface (not shown), such as a high-definition multimedia interface (HDMI) port.

In some embodiments, the computing device 106 may include one or more remote computing devices deployed in a networked architecture. The exact physical location, connectivity, and configuration of the remote computing devices may be unknown and/or unimportant. Accordingly, in some embodiments, the computing device 106 may be referred to as a "cloud-based" device that may be housed at various remote locations.

Figure 2A:
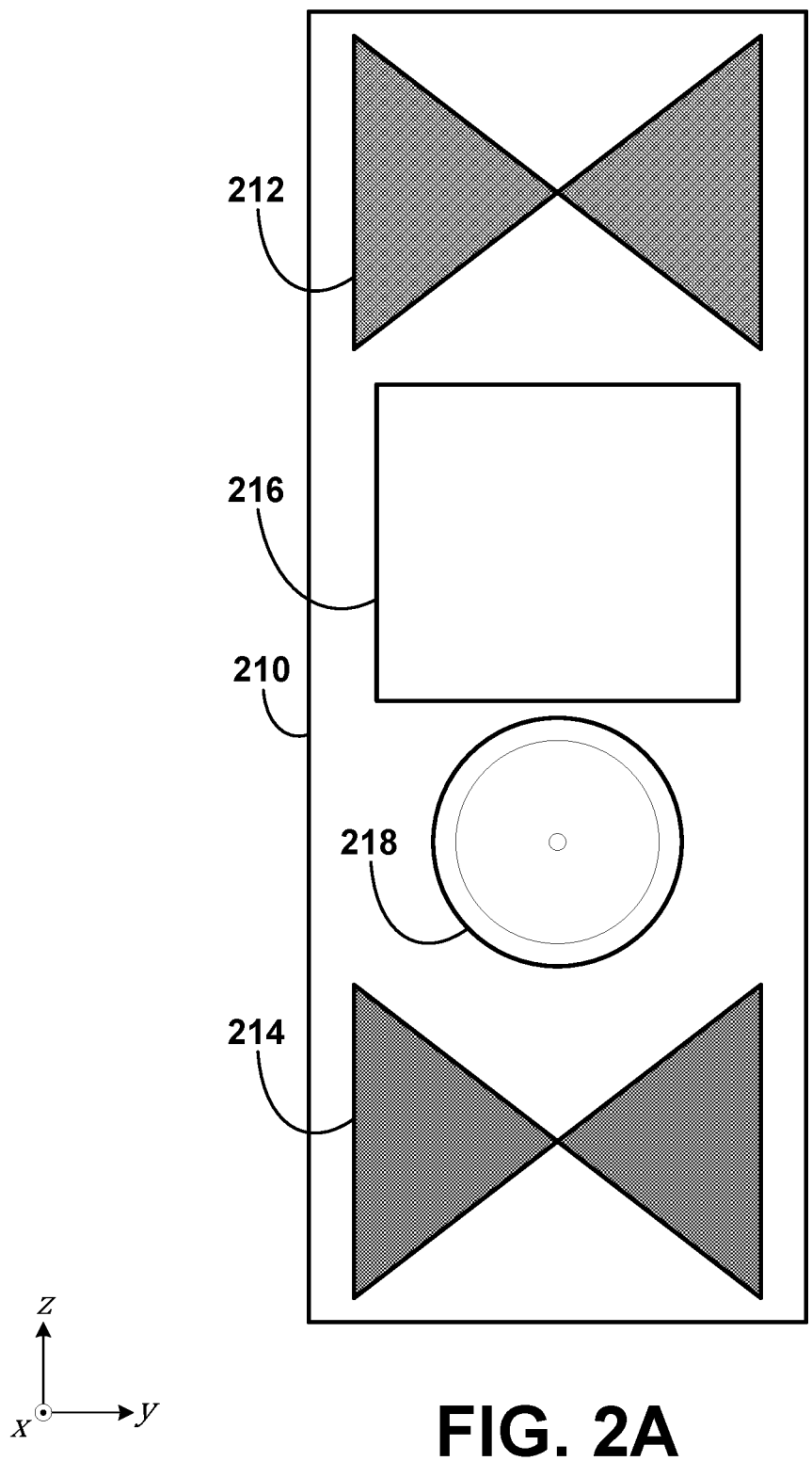
FIG. 2A is a front-view illustration of a mount, according to example embodiments.

FIG. 2A is a front-view illustration of a mount 210, according to example embodiments. The mount 210 may be used to position, translate, and/or rotate the camera being calibrated. For example, in some embodiments, the mount 210 may be driven by a motorized stage (e.g., a tip/tilt stage) (not shown). A lens 218 of the camera may be attached to the mount 210 or otherwise positioned such that the camera can capture images through an aperture in the mount 210. For example, the camera may be attached to the mount using one or more pins. Such pins may orient the camera in roll (e.g., a rotational direction about the x-axis illustrated in FIG. 2A). Further, such pins may be used as mechanical datums for calibration techniques described herein. The mount 210 may also include a first camera-orientation fiducial 212, a second camera-orientation fiducial 214, and a mount mirror 216 affixed to the mount 210 (e.g., adjacent to the lens 218).

The camera being calibrated may be a camera that is used for detecting objects within a scene. For example, the camera may be a component of an object detection and identification system used in a computer vision application (e.g., in a robot or an autonomous vehicle). Additionally or alternatively, the camera may be used as a calibration tool (e.g., to serve as "ground truth" for the calibration of a different device or system). In such embodiments, upon completion of a calibration method, another sensing device (e.g., a radar detector or a LIDAR detector) may be positioned, adjusted, or otherwise altered based on additional calibration images captured using the calibrated camera.

In some embodiments, the camera may include a digital camera (e.g., a camera that stores images electrically or magnetically as a series of bits). Such a digital camera may include one or more an image sensors, such as charge-coupled devices (CCD) and/or complementary metal-oxide-semiconductor (CMOS) image sensors. Additionally or alternatively, the camera may include a film camera (i.e., a camera that stores images chemically on a strip of photographic film). The camera may be a still camera or a video camera. In some embodiments, the camera may be capable of functioning as both a still camera and a video camera, depending on operating settings of the camera (e.g., as selected by a controller of the camera).

In addition, the camera may include one or more additional optical components. For example, the lens 218 may be used to adjust a focal length of the camera. In some embodiments, the camera may include one or more mirrors to modify a light path within the camera (e.g., to direct light from the scene to an image sensor within the camera). Still further, the camera may include other optics, such as a polarization filter, a neutral-density filter, an aperture (e.g., implemented using an iris), a chromatic filter, etc. Any of the optical components within the camera may be adjustable, removable, and/or interchangeable, in various embodiments.

As illustrated in FIG. 2A, the first camera-orientation fiducial 212, the second camera-orientation fiducial 214, the mount mirror 216, and the lens 218 may be aligned vertically (e.g., along the z-axis, as illustrated) on the mount 210; the first camera-orientation fiducial 212 being above the mount mirror 216, which is itself above the lens 218, which is itself above the second camera-orientation fiducial 214. In other embodiments, other arrangements are also possible. Additionally, some embodiments may include additional mirrors and/or fiducials. Further, in some embodiments, the camera-orientation fiducials 212, 214, the mount mirror 216, and/or the lens 218 may be arranged horizontally with respect to one another.

Figure 2B:
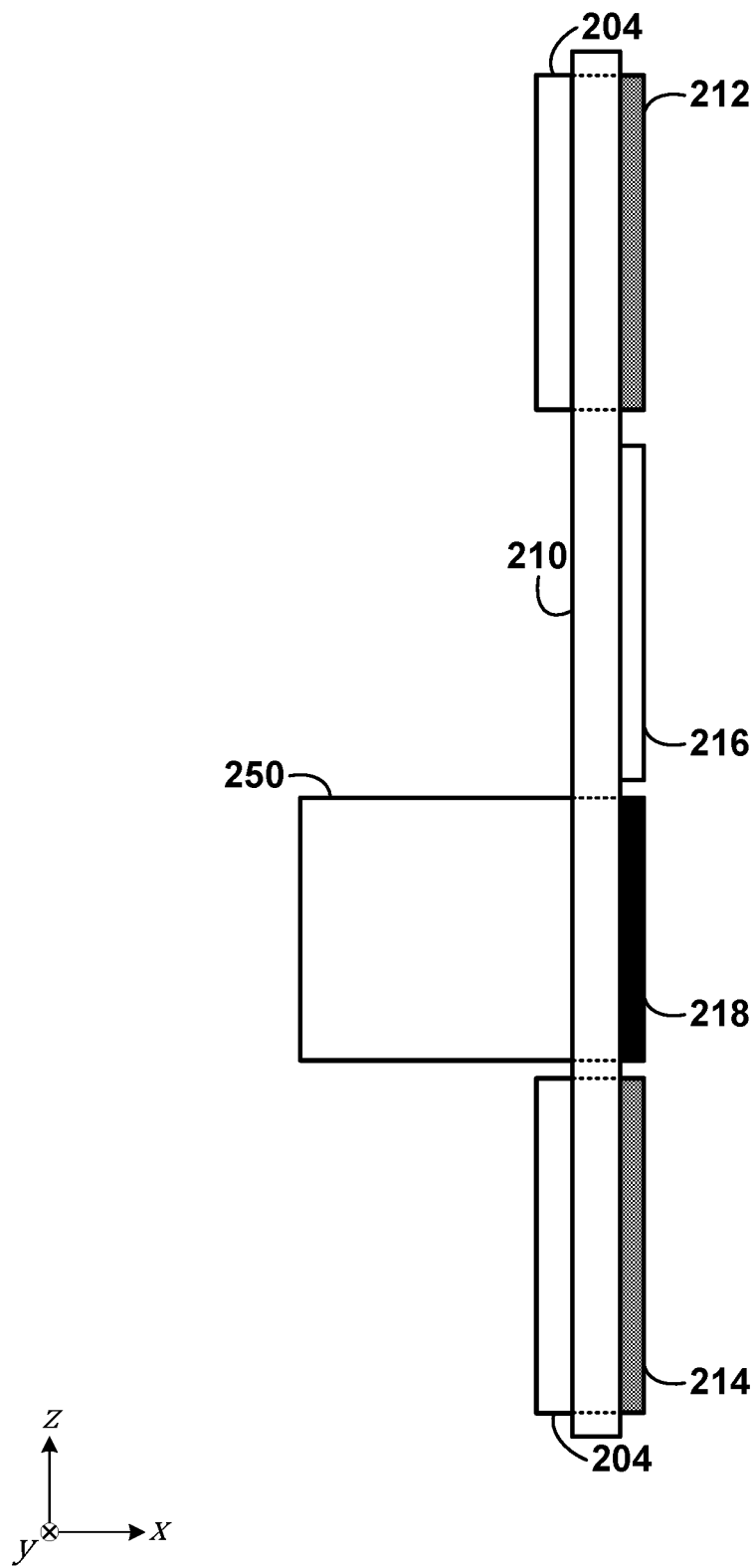
FIG. 2B is a side-view illustration of a mount, according to example embodiments.

The camera-orientation fiducials 212, 214 may be formed in various ways. For example, the camera-orientation fiducials 212, 214 may be patterns printed on the mount 210. Alternatively, the camera-orientation fiducials 212, 214 may be images displayed by one or more displays (e.g., LCDs or LED displays). In still other embodiments, the camera-orientation fiducials 212, 214 may be defined by cutaway portions (i.e., excised portions) of the mount 210 that are illuminated from behind (e.g., using a light source as illustrated in FIG. 2B). In even still other embodiments, the camera-orientation fiducials 212, 214 may be masks with specified patterns that are placed over a light source (e.g., a plexiglass piece with black tape placed thereon that defines the shape of the respective camera-orientation fiducial 212, 214).

As illustrated, the first camera-orientation fiducial 212 and the second camera-orientation fiducial 214 may be shaped as bowties (e.g., each shaped as two triangles having one shared vertex in the center of the respective fiducial). Also as illustrated, the first camera-orientation fiducial 212 and the second camera-orientation fiducial 214 may be the same size as each other. In other embodiments, the two camera-orientation fiducials 212, 214 may be different sizes and/or shapes from one another and/or from what is illustrated in FIG. 2A. For example, one or both of the camera-orientation fiducials 212, 214 may have a circular shape, a triangular shape, a rectangular shape, a pentagonal shape, a hexagonal shape, a heptagonal shape, an octagonal shape, a nonagonal shape, a decagonal shape, a checkerboard shape, a chevron shape, a crosshair shape, an x-shape, etc. In some embodiments, one or both of the camera-orientation fiducials 212, 214 may be holographic.

In some embodiments, the camera-orientation fiducials 212, 214 can include at least one feature that can be identified using computer-vision techniques. For example, as illustrated in FIG. 2A, the first camera-orientation fiducial 212 and the second camera-orientation fiducial 214 each include a vertex at the center of the bowtie that can be identified using commands from the OpenCV library. Additionally, the bowtie shape may allow the camera-orientation fiducials 212, 214 to provide information about the pitch, yaw, and roll of the camera-orientation fiducials 212, 214 on the mount 210 when captured in a calibration image. Further, in some embodiments, subpixel optimization may be performed on captured calibration images of the bowtie shape to more accurately determine the centerpoint (i.e., center vertex) of the bowtie. For example, a coarse position (e.g., at an integer pixel resolution) of the centerpoint of the bowtie may be determined and then, using gradient descent and computer vision techniques, a subpixel location of the centerpoint of the bowtie may be determined.

Further, in some embodiments, one or both of the camera-orientation fiducials 212, 214 may exhibit particular optical properties (e.g., such that the camera-orientation fiducials 212, 214 are readily detectable/distinguishable). For example, the camera-orientation fiducials 212, 214 may emit light of a specific wavelength (e.g., within the visible spectrum or infrared spectrum), range of wavelengths (e.g., within the visible spectrum or infrared spectrum), polarization, or group of polarizations. To achieve this, the camera-orientation fiducials 212, 214 may include one or more filters and/or light sources having specified output wavelengths and/or polarizations. In addition, the lens 218 may include one or more filters to select for light having the optical properties of the camera-orientation fiducials 212, 214 and eliminate noise from light not related to the camera-orientation fiducials 212, 214.

In some embodiments, the mount 210 may include one or more stages (e.g., tip/tilt stages). For example, the mount 210 may include a first stage configured to rotate the camera being calibrated, the first camera-orientation fiducial 212, the second camera-orientation fiducial 214, and the mount mirror 216 in a yaw direction (e.g., about the z-axis illustrated in FIG. 2A). The mount 210 may also include a second stage configured to rotate the camera being calibrated, the first camera-orientation fiducial 212, the second camera-orientation fiducial 214, and the mount mirror 216 in a pitch direction (e.g., about the y-axis illustrated in FIG. 2A). Additionally or alternatively, the mount 210 may include an additional stage configured to rotate the camera being calibrated, the first camera-orientation fiducial 212, the second camera-orientation fiducial 214, and the mount mirror 216 in a roll direction (e.g., about the x-axis illustrated in FIG. 2A). It is understood that, in some embodiments, the one or more stages may rotate the camera being calibrated, the first camera-orientation fiducial 212, the second camera-orientation fiducial 214, and the mount mirror 216 in a combination of directions (e.g., pitch and yaw directions; pitch and roll directions; yaw and roll directions; or yaw, pitch, and roll directions). In some embodiments, the mount 210 may also include one or more stages configured to translate the camera being calibrated, the first camera-orientation fiducial 212, the second camera-orientation fiducial 214, and the mount mirror 216 in one or more directions (e.g., the x-direction, y-direction, and/or z-direction illustrated in FIG. 2A).

FIG. 2B is a side-view illustration of the mount 210, according to example embodiments. As illustrated in FIG. 2B and described above, the mount 210 may also include one or more light sources 204. Further, the camera body 250 of a camera being calibrated may extend back from the lens 218. The dashed lines on the mount 210 may represent portions of the mount 210 that are removed from an interior of the mount (e.g., to allow light and/or the body 250/lens 218 to pass through). Such portions may be circular portions in the case of the body 250/lens 218 of the camera. Additionally or alternatively, in the case of the first camera-orientation fiducial 212 and the second camera-orientation fiducial 214, the excised portions of the mount may be shaped like the camera-orientation fiducials (e.g., the excised portions, themselves, may actually define the shape of the camera-orientation fiducials 212, 214).

The light sources 204 may each include one or more light emitters (e.g., one or more light emitters arranged in an array). For example, each of the light sources 204 may include one or more light-emitting diodes (LEDs). Additionally or alternatively, one or more of the light sources 204 may include vertical cavity surface emitting lasers (VCSELs), organic light emitting diodes (OLEDs), polymer light emitting diodes (PLEDs), light emitting polymers (LEPs), or liquid-crystal displays (LCDs). The light sources 204 may each output light of the same wavelength or range of wavelengths as one another (e.g., each of the light sources 204 may emit white light). Alternatively, the light sources 204 may output light of different wavelengths or ranges of wavelengths (e.g., the top light source 204 may emit light within the red spectrum and the bottom light source 204 may emit light within the blue spectrum). Similarly, the light sources 204 may each output light of the same polarization (e.g., each of the light sources 204 may emit horizontally polarized light) or may output light light of different polarizations (e.g., the top light source 204 may emit horizontally polarized light and the bottom light source 204 may emit vertically polarized light). As described above, it may be desired that each of the light sources 204 emits selectable wavelengths corresponding to different channels that are to be calibrated within the camera (e.g., a red wavelength corresponding to a red channel in the camera, a green wavelength corresponding to a green channel in the camera, and a blue wavelength corresponding to a blue channel in the camera).

The light sources 204 may be controlled (e.g., illuminated) independently from one another, in some embodiments. For example, a first computing device (e.g., controller) may control the top light source 204 and a second computing device (e.g., controller) may control the bottom light source 204. In other embodiments, the light sources may be controlled (e.g., illuminated) together (e.g., by a single computing device). Such a computing device may be configured to modulate the light sources 204, as well (e.g., modulate the output power and/or wavelength of the respective light sources 204). For example, the range of wavelengths output by the light sources 204 may cycle from red to green to blue in a predetermined pattern. Such a pattern may allow the camera being calibrated to capture a series of consecutive calibration images that can be used to calibrate different channels of the camera (e.g., a red channel, a green channel, and a blue channel). This may allow for a calibration that accounts for chromatic aberration within the camera.

Such a computing device (e.g., controller) configured to control the light sources 204 may additionally or alternatively control the first camera-orientation fiducial 212 and/or the second camera-orientation fiducial 214 (e.g., if the first camera-orientation fiducial 212 or the second camera-orientation fiducial 214 include one or more adjustable filters). As such, the computing device may also adjust one or more of the camera-orientation fiducials 212, 214 (e.g., modify the wavelength range being filtered by one or more filters corresponding to one or more of the camera-orientation fiducials 212, 214).

In still other embodiments, rather than separate light sources 204 positioned behind the mount 210 to illuminate the camera-orientation fiducials 212, 214, the mount 210 may include a single light source that illuminates both camera-orientation fiducials 212, 214. For example, a single bright light source (e.g., a white light source) may be positioned on an opposite side of the mount 210 from the camera-orientation fiducials 212, 214 such that the bright light source shines through the mount (e.g., through cutaway portions of the mount 210 corresponding to both camera-orientation fiducials 212, 214). Alternatively, light from a single source may be directed to each of the camera-orientation fiducials 212, 214 (e.g., via waveguides, such as optical fibers).

Figure 3A:
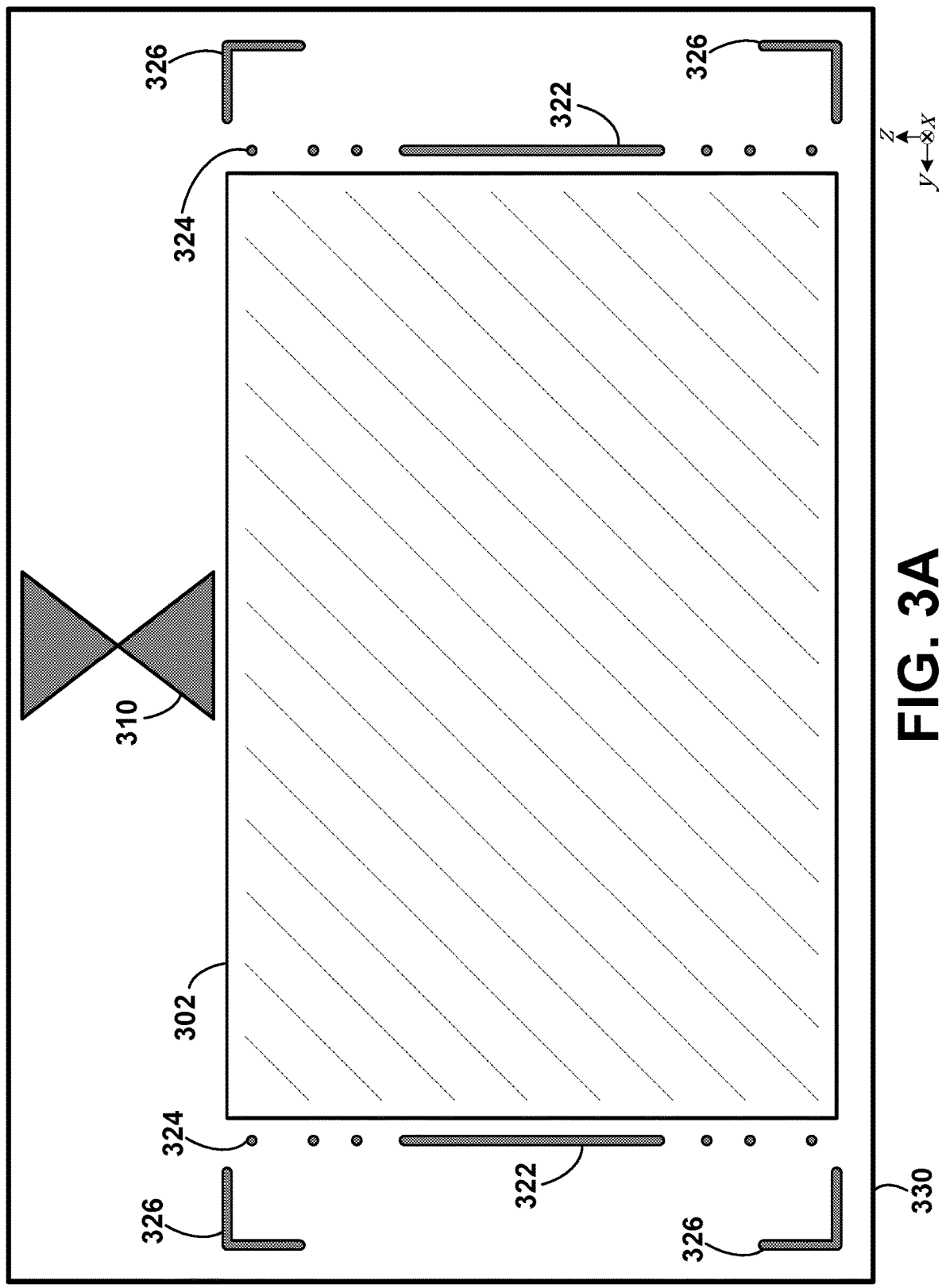
FIG. 3A is a front-view illustration of a first calibration target, according to example embodiments.

FIG. 3A is a front-view illustration of a first calibration target 330. The first calibration target 330 may include a first mirror 302, a plurality of fiducials positioned adjacent to the mirror, and an indexing fiducial 310. The plurality of fiducials may include line fiducials 322 (i.e., linear fiducials), dot fiducials 324 (i.e., point fiducials), and framing fiducials 326.

Figure 3B:
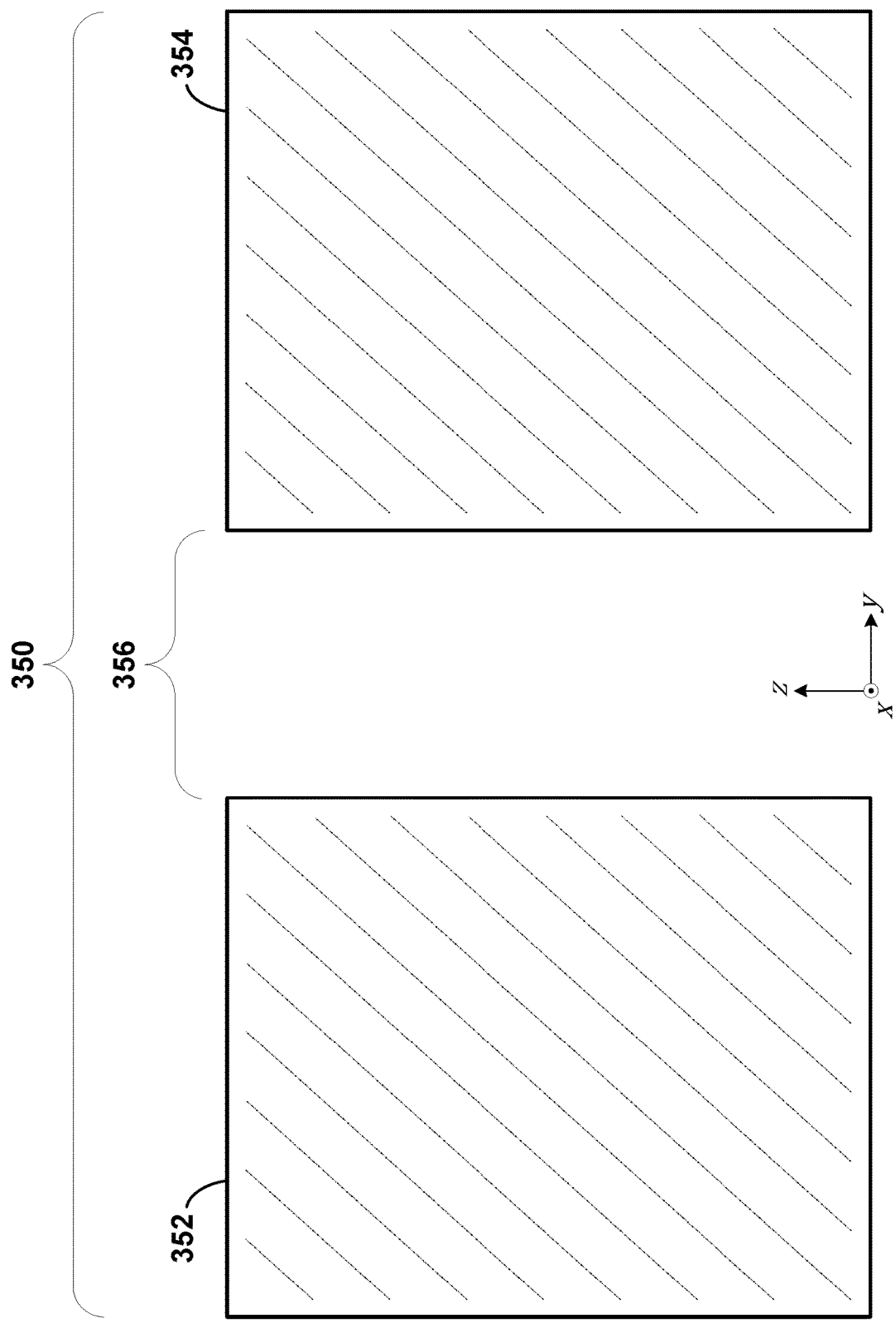
FIG. 3B is a front-view illustration of a second calibration target, according to example embodiments.

When the first calibration target 330 and a second calibration target (e.g., as illustrated in FIG. 3B) are positioned such that the first calibration target 330 faces the second calibration target, the plurality of fiducials may be reflected by one or more second mirrors of the second calibration target. In addition, the first mirror 302 may re-reflect the one or more reflections of the plurality of fiducials. This pattern of reflection and re-reflection may continue multiple times (potentially, ad infinitum, until limited by diffraction or other effects), thereby generating a series of iterated reflections of the plurality of fiducials.

As illustrated in FIG. 3A, the indexing fiducial 310 may be shaped like an hourglass (e.g., may be shaped similar to the bowtie shapes of the camera-orientation fiducials 212, 214, but rotated 90°). In other embodiments, the indexing fiducial 310 may have a different shape. For example, the indexing fiducial 310 may have a circular shape, a triangular shape, a rectangular shape, a pentagonal shape, a hexagonal shape, a heptagonal shape, an octagonal shape, a nonagonal shape, a decagonal shape, a checkerboard shape, a chevron shape, a crosshair shape, an x-shape, etc. In some embodiments, the indexing fiducial 310 may be holographic. In some embodiments, the indexing fiducial 310 has at least one point that can be identified using computer-vision techniques. For example, the hourglass shape of the indexing fiducial 310 includes a vertex at the center (i.e., a centerpoint) that can be identified using commands from the OpenCV library. Additionally, the hourglass shape may allow the indexing fiducial 310 to provide information about the pitch, yaw, and roll of the camera relative to the first calibration target 330 when captured in a calibration image. Information about the pitch, yaw, and/or roll of the camera relative to the first calibration target 330 may be refined based on previously determined camera calibration data (e.g., a distortion matrix), in some embodiments. For example, the intrinsic camera calibration may be used when determining the pitch, yaw, and/or roll of the camera relative to the first calibration target 330. Further, in some embodiments, subpixel optimization may be performed on captured calibration images of the hourglass shape to more accurately determine the centerpoint (i.e., center vertex) of the hourglass. For example, a coarse position (e.g., at an integer pixel resolution) of the centerpoint of the hourglass may be determined and then, using gradient descent and computer vision techniques, a subpixel location of the centerpoint of the hourglass may be determined. Further, in some embodiments there may be more than one indexing fiducial 310 or no indexing fiducials on the first calibration target 330.

As described above, a series of iterated reflections of the plurality of fiducials may be generated. However, the indexing fiducial 310 may not be reflected by the second calibration target (e.g., due to an aperture defined between two or more mirrors in the second calibration target, as described below with reference to FIG. 3B). As such, iterated reflections of the indexing fiducial 310 may not be generated (even if the first calibration target 330 is positioned such that it faces a second calibration target). Hence, in a calibration image captured of the first calibration target 330, because the indexing fiducial 310 may only appear once (e.g., because no reflections of the indexing fiducial 310 are generated), the indexing fiducial 310 may be used to identify a zeroth-order reflection (i.e., an unreflected portion) within the calibration image. Once identified, the zeroth-order reflection may be used to frame the iterated series of reflections. Additionally or alternatively, a lens of the camera being calibrated may be adjusted (e.g., using auto-focus) such that indexing fiducial 310 is in focus. Based on the position of a stage (e.g., a rotational or translational stage) used to adjust a camera on the mount 210, a distance between the camera being calibrated and the indexing fiducial 310 on the first calibration target 330 may be identified. If the camera is positioned co-planar with the second calibration target, the apparent distance to each of the iterated reflections of the plurality of fiducials may be determined based on the distance between the camera and the first calibration target 330 (e.g., the distance between the camera and the indexing fiducial 310 is x, the distance between the camera and the image of the first-order iterated reflections is 3x, the distance between the camera and the image of the second-order iterated reflections is 5x, etc.).

As described above, the plurality of fiducials may include the line fiducials 322, the dot fiducials 324 and the framing fiducials 326. The framing fiducials 326 may be used to identify the outer bounds of the relevant area of a given iterated reflection (e.g., the outer bounds of the third-order iterated reflection). For example, a calibration algorithm (e.g., executed by a computing device) may identify the locations of the framing fiducials 326 within a calibration image and then, based on the locations of the framing fiducials 326, search within the boundary of the framing fiducials 326 for the line fiducials 322 and/or dot fiducials 324. In alternate embodiments, there may be a greater or lesser number of framing fiducials, the shape of one or more of the framing fiducials may be different, and/or the position on the first calibration target of the framing fiducials may be different.

The line fiducials 322 may be used to identify a vanishing point within a captured image of the iterated reflections. For example, iterated reflections of the line fiducials 322 may appear to converge on a vanishing point within a captured calibration image (e.g., as described/illustrated with reference to FIG. 4F). The dot fiducials 324 may also converge to the vanishing point. Additionally, in some embodiments, the dot fiducials 324 may be used to locate the line fiducials 322 within the calibration image. For example, as illustrated in FIG. 3A, the dot fiducials 324 flank both sides of the line fiducials 322. Hence, the dot fiducials 324 may be identified within a calibration image by a calibration algorithm (e.g., executed by a computing device) and then, based on the locations of the dot fiducials 324, the calibration algorithm may identify the line fiducials 322. Additionally or alternatively, the dot fiducials 324 may be used to identify tilt within the first calibration target 330 relative to the camera capturing the calibration image. For example, by detecting the pixel position of multiple dot fiducials 324 within a captured calibration image, a roll angle (e.g., a rotation about the x-axis illustrated in FIG. 3A) may be determined.

In various embodiments, there may be greater or fewer line fiducials 322 and/or dot fiducials 324 than illustrated in FIG. 3A. Further, the size and/or shape of the line fiducials 322 and/or the dot fiducials 324 may be different in some embodiments. Additionally or alternatively, in some embodiments, the arrangement of the line fiducials 322 and dot fiducials 324 relative to one another and/or relative to the indexing fiducial 310 or to the first mirror 302 may be different than illustrated in FIG. 3A.

Similar to the camera-orientation fiducials 212, 214, the indexing fiducial 310, the line fiducials 322, the dot fiducials 324, and/or the framing fiducials 326 may be formed in various ways. For example, the indexing fiducial 310, the line fiducials 322, the dot fiducials 324, and/or the framing fiducials 326 may be patterns printed on the first calibration target 330. Alternatively, the indexing fiducial 310, the line fiducials 322, the dot fiducials 324, and/or the framing fiducials 326 may be images displayed across one or more displays (e.g., LCDs or LED displays). In still other embodiments, the indexing fiducial 310, the line fiducials 322, the dot fiducials 324, and/or the framing fiducials 326 may include cutaway portions (i.e., excised portions) of the first calibration target 330 that are illuminated from behind (e.g., using a light source, such as one or more of light sources 304 as illustrated in FIG. 3C). In even still other embodiments, the indexing fiducial 310, the line fiducials 322, the dot fiducials 324, and/or the framing fiducials 326 may be masks with specified patterns that are placed over a light source.

In some embodiments the indexing fiducial 310, the line fiducials 322, the dot fiducials 324, and/or the framing fiducials 326 may each be illuminated using a wavelength or range of wavelengths and/or using a polarization or range of polarizations (e.g., like the camera-orientation fiducials 212, 214). This may be accomplished by light sources used to illuminate the indexing fiducial 310, the line fiducials 322, the dot fiducials 324, and/or the framing fiducials 326, and/or by filters associated with the indexing fiducial 310, the line fiducials 322, the dot fiducials 324, and/or the framing fiducials 326. Such light sources and/or filters may be adjustable. Further, the same wavelengths, ranges of wavelengths, polarizations, or ranges of polarizations or different wavelengths, ranges of wavelengths, polarizations, or ranges of polarizations may be used to illuminate the indexing fiducial 310, the line fiducials 322, the dot fiducials 324, and/or the framing fiducials 326. For example, each of the indexing fiducial 310, the line fiducials 322, the dot fiducials 324, and the framing fiducials 326 may be illuminated using a unique wavelength such that each fiducial is identifiable within a captured calibration image relative to each other fiducial. Any of the techniques described above to illuminate and/or adjust the illumination of the camera-orientation fiducials 212, 214 may likewise be applied to the indexing fiducial 310, the line fiducials 322, the dot fiducials 324, and/or the framing fiducials 326.

FIG. 3B is a front-view illustration of a second calibration target 350, according to example embodiments. The second calibration target 350 may include mirror 352 and mirror 354 separated by a distance 356. The distance 356 separating the mirrors 352, 354 may define an aperture through which the first calibration target 330 can be observed (e.g., by a camera capturing calibration images/undergoing calibration).

In some embodiments, the mirrors 352, 354 may be co-planar or substantially co-planar with one another (e.g., the x-position of mirror 352 may be within 5.0 cm of the x-position of mirror 354, i.e., the mirrors 352, 354 may be within 5.0 cm of coplanar). In other embodiments, the mirrors 352, 354 may be staggered from one another (e.g., separated along the x-direction illustrated in FIG. 3B to produce iterated reflections of different depths within a calibration image). Additionally or alternatively, the mirrors 352, 354 may have substantially the same rotational orientation. For example, the mirrors 352, 354 may be within 1.0° of parallel (e.g., the rotation of mirror 352 about the z-axis may be within 1.0° of the rotation of the mirror 354 about the z-axis).

In alternate embodiments, rather than two mirrors separated by a distance (as in FIG. 3B), the second calibration target 350 may instead include a single mirror with an aperture defined therein (e.g., through which a camera undergoing calibration could view the first calibration target 330 through the second calibration target 350). For example, a single mirror may have a hole defined within its center (e.g., the hole being larger than the size of a lens of the camera to be calibrated). In some embodiments, the aperture defined within the single mirror may be large enough such that, when the second calibration target 350 is positioned facing the first calibration target 330, the indexing fiducial 310 is not reflected by the second calibration target 350 (and, consequently, no iterated reflections of the indexing fiducial 310 are generated).

FIG. 3C is a top-view illustration of a calibration system, according to example embodiments. As illustrated, the calibration system may include the second calibration target 350 (e.g., the mirrors 352, 354) and the first calibration target 330. The mirrors 352, 354 may be separated from one another by the distance 356 and separated from the first calibration target 330 by a distance 392. Further, the calibration system may include the mount 210 (having the camera, including the camera body 250, affixed thereto) positioned such that the camera is able to capture a calibration image of iterated reflections of the plurality of fiducials through an aperture formed by the separation 356 between the mirrors 352, 354 of the second calibration target 350. As illustrated, the second calibration target 350 (i.e., the mirrors 352, 354 with the defined separation 356) may be positioned roughly parallel with the first calibration target 330.

As illustrated, the first calibration target 330 may also include light sources 304. The light sources 304 may be used to illuminate the indexing fiducial 310, the line fiducials 322, the dot fiducials 324, and/or the framing fiducials 326. The light sources 304 may be capable of performing any of the functions described above and may include any of the devices described above with respect to the light sources 204 of FIG. 2B. Similarly, each of the light sources 304 may be independently controllable or the light sources 304 may be jointly controllable. In addition, each of the light sources 304 may be jointly powered by a single power source or each of the light sources 304 may be separately powered by different power sources. Further, similar to the light sources 204, the light sources 304 of FIG. 3C may instead be a single light source with multiple channels fed to multiple fiducials.

Figure 3D:
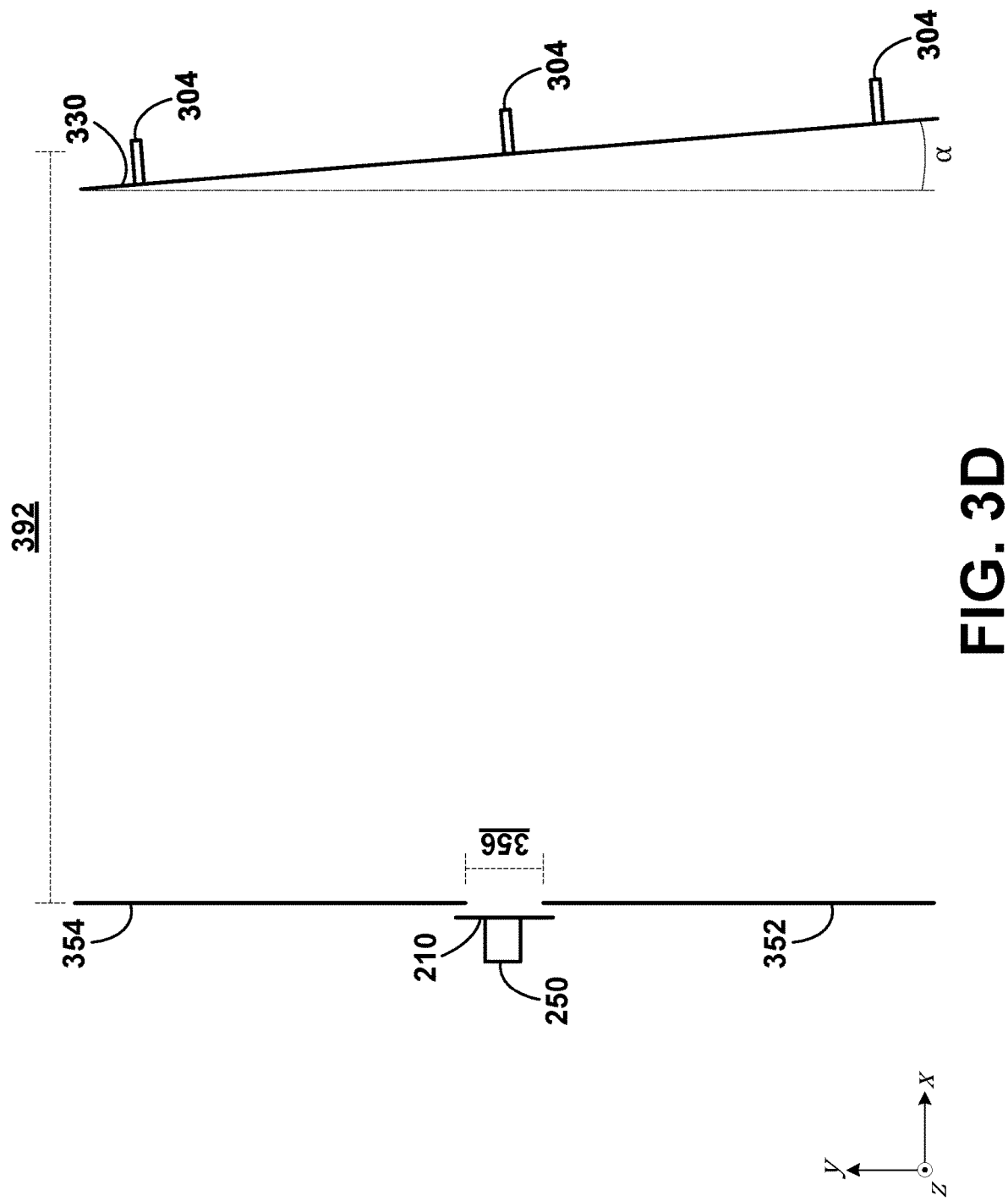
FIG. 3D is a top-view illustration of a calibration system, according to example embodiments.

FIG. 3D is a top-view illustration of a calibration system, according to example embodiments. Similarly to the calibration system in FIG. 3C, the calibration system illustrated in FIG. 3D includes the mirrors 352, 354 (i.e., the second calibration target 350) and the mount 210 (having the camera, including the camera body 250, affixed thereto) separated from the first calibration target 330 by the distance 392. However, in FIG. 3D, the first calibration target 330 may be positioned at an angle α with respect to the mirrors 352, 354 (e.g., the first calibration target 330 may be rotated by an angle α about the z-axis). The angle α may have various magnitudes (e.g., 0.01°, 0.1°, 0.5°, 1.0°, 2.0°, 3.0°, 4.0°, 5.0°, 6.0°, 7.0°, 8.0°, 9.0°, 10.0°, etc.). For example, the first calibration target may be positioned such that the first mirror 302 and each of the mirrors 352, 354 are greater than 0.1° within parallel of one another but less than 10.0° within parallel of one another (i.e., α may be greater than 0.1° but less than 10.0°).

In some embodiments, the angle α of the first calibration target 330 with respect to the mirrors 352, 354 (i.e., the second calibration target 350) may be intentional. For example, an angle of the two calibration targets 330, 350 relative to one another may be determinable based on a calibration image and, therefore, may be accounted for during the calibration of a camera. Alternatively, the angle α of the first calibration target 330 with respect to the mirrors 352, 354 (i.e., the second calibration target 350) may result from inherent imprecision in the positioning of the calibration targets (i.e., may result from the fact that it is impractical or impossible to position the first calibration target 330 and the second calibration target 350 relative to one another such that they are exactly parallel).

FIGS. 4A-4D are illustrations of various iterated reflections in a calibration system (e.g., the calibration system of FIG. 3D), according to example embodiments. It is understood that FIGS. 4A-4D are provided for illustrative purposes. For example, even though multiple light signals from different fiducials may intersect the lens of the camera on the mount 210 at the same location of the lens, it is understood that, in many embodiments, the light signals from the different fiducials may intersect the lens at different locations of the lens. Further, it is understood that each of the iterated reflections may be included in a single calibration image captured by the camera being calibrated (i.e., the iterated reflections of FIGS. 4A-4D may each be components that make up a single calibration image). The iterated reflections of various indices (i.e., the zeroth-order reflection, the first-order reflection, the second-order reflection, the third-order reflection, etc.) are illustrated separately for illustrative purposes only (e.g., to avoid clutter in the figures).

Figure 4A:
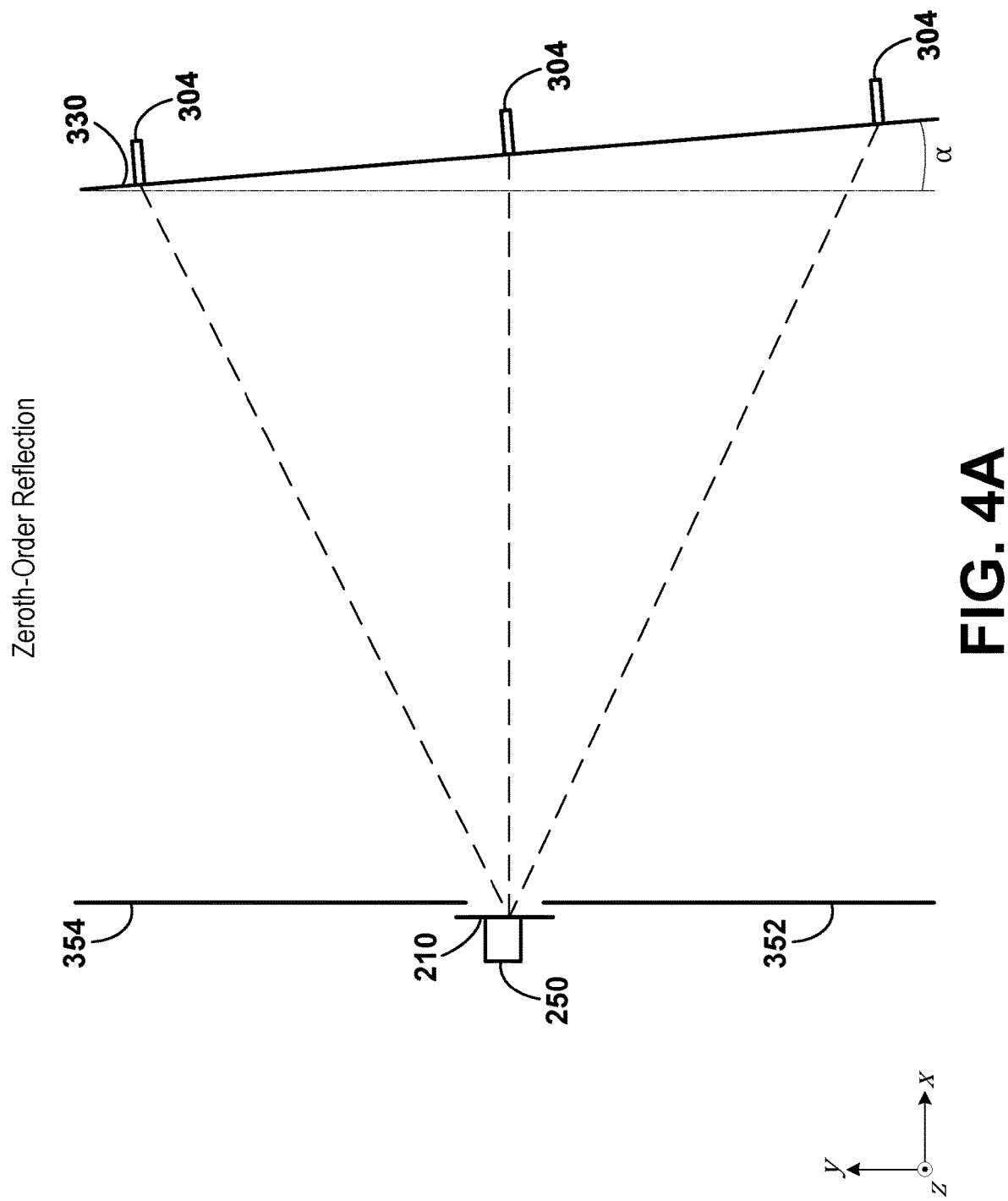
FIG. 4A is an illustration of a zeroth-order reflection in a calibration system, according to example embodiments.
Figure 4B:
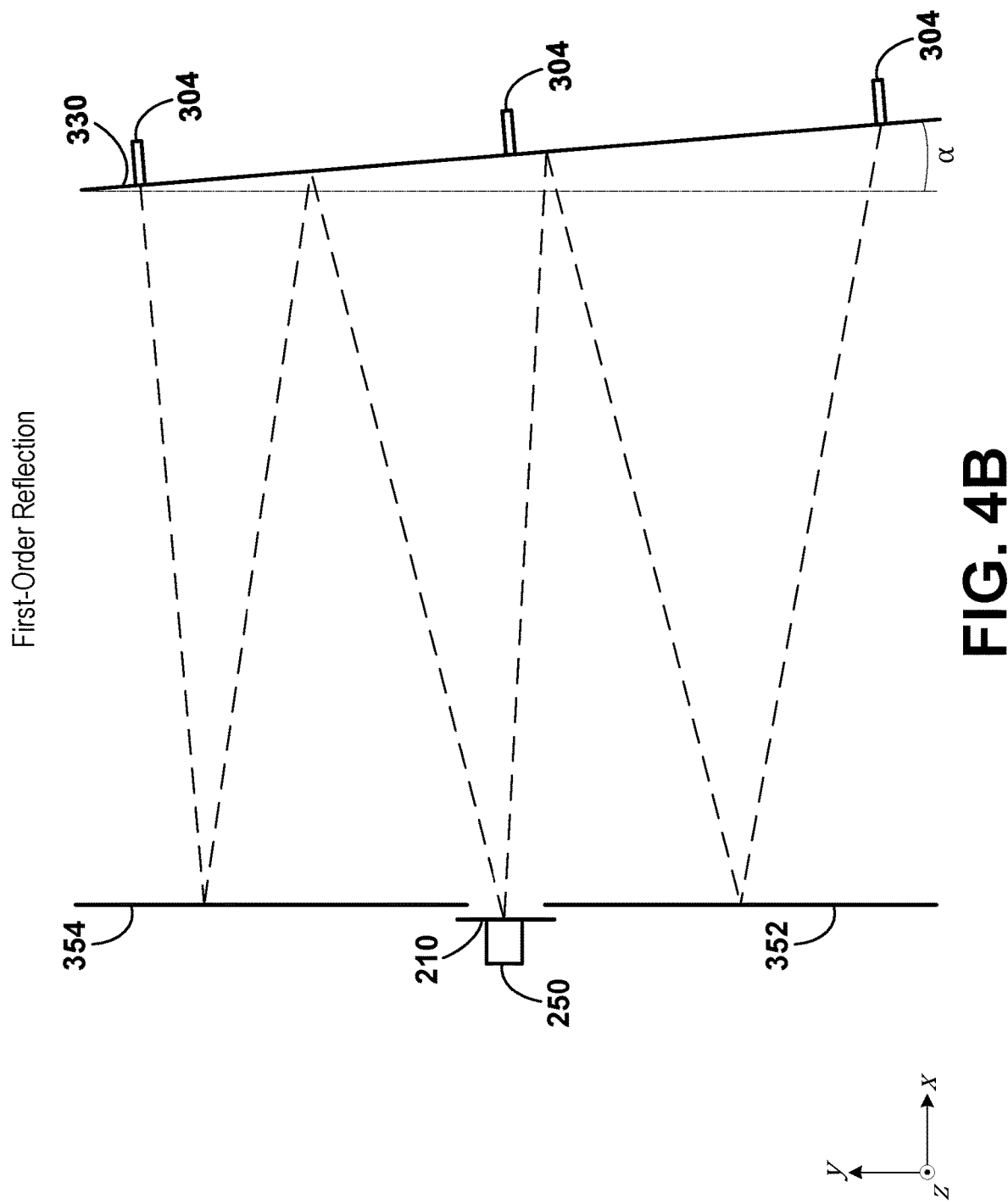
FIG. 4B is an illustration of a first-order reflection in a calibration system, according to example embodiments.
Figure 4C:
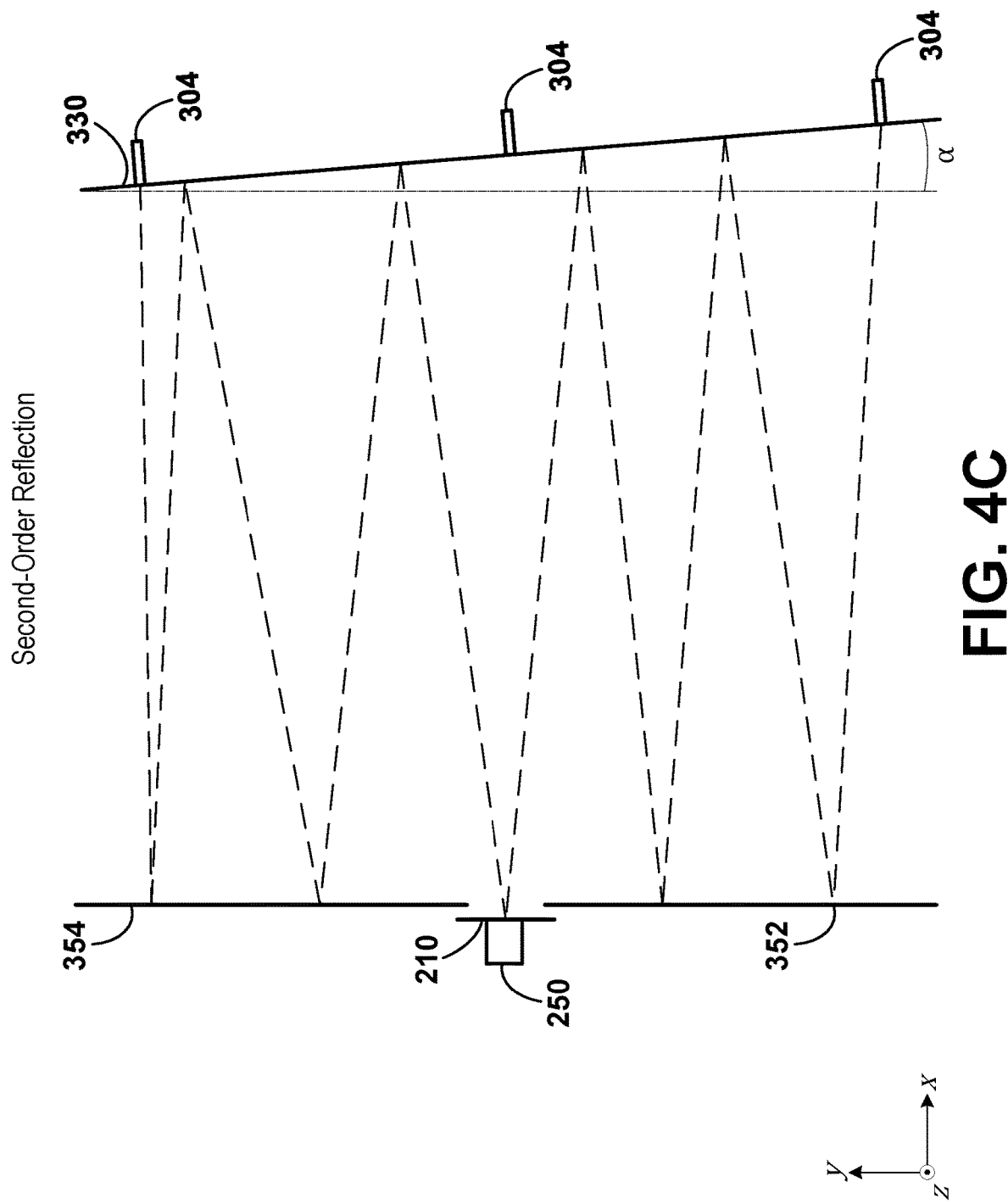
FIG. 4C is an illustration of a second-order reflection in a calibration system, according to example embodiments.
Figure 4D:
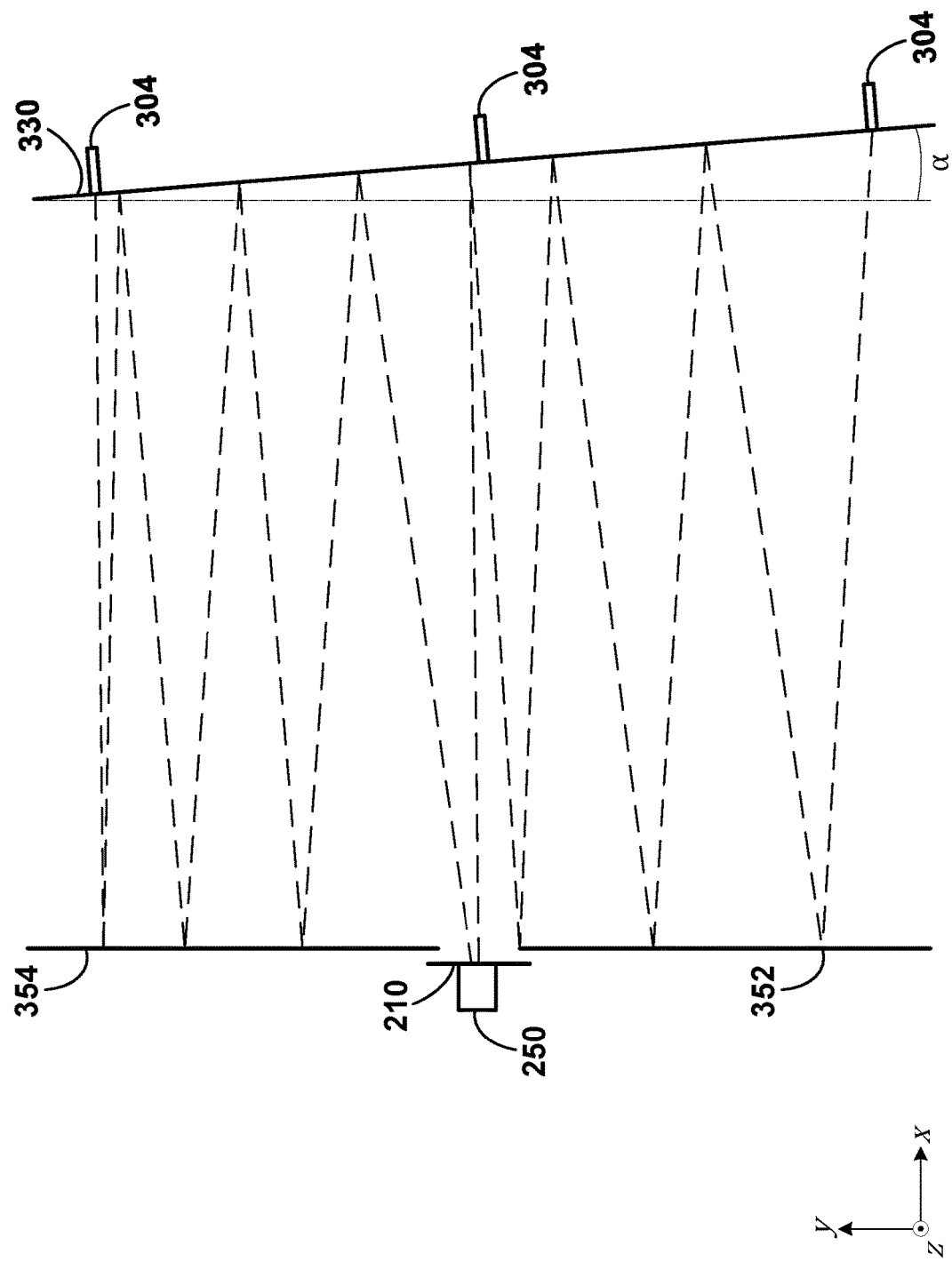
FIG. 4D is an illustration of a third-order reflection in a calibration system, according to example embodiments.

As illustrated in FIGS. 4A-4D, the iterated reflections may include differing numbers of reflections/re-reflections between the first calibration target 330 and the mirrors 352, 354 (of the second calibration target 350). For example, the portion of a captured calibration image attributable to a zeroth-order reflection (as illustrated in FIG. 4A) may only include light from the fiducials (e.g., the indexing fiducial 310, the line fiducials 322, the dot fiducials 324, and the framing fiducials 326) that takes a direct path from the respective fiducials to the camera (i.e., is not reflected by the mirrors 352, 354 or the first mirror 302 of the first calibration target 330). Further, the portion of a captured calibration image attributable to a first-order reflection (as illustrated in FIG. 4B) may only include light from the fiducials (e.g., the line fiducials 322, the dot fiducials 324, and the framing fiducials 326) that undergoes one pair of reflections (e.g., a first reflection from the mirror 352 or the mirror 354 and a second reflection from the first mirror 302 of the first calibration target 330). Similarly, the portion of a captured calibration image attributable to a second-order reflection (as illustrated in FIG. 4C) may only include light from the fiducials (e.g., the line fiducials 322, the dot fiducials 324, and the framing fiducials 326) that undergoes two pairs of reflections (e.g., a first reflection from the mirror 352 or the mirror 354, a second reflection from the first mirror 302 of the first calibration target 330, a third reflection from the mirror 352 or the mirror 354, and a fourth reflection from the first mirror 302 of the first calibration target 330). Likewise, the portion of a captured calibration image attributable to a third-order reflection (as illustrated in FIG. 4D) may only include light from the fiducials (e.g., the line fiducials 322, the dot fiducials 324, and the framing fiducials 326) that undergoes three pairs of reflections (e.g., a first reflection from the mirror 352 or the mirror 354, a second reflection from the first mirror 302 of the first calibration target 330, a third reflection from the mirror 352 or the mirror 354, a fourth reflection from the first mirror 302 of the first calibration target 330, a fifth reflection from the mirror 352 or the mirror 354, and a sixth reflection from the first mirror 302 of the first calibration target 330).

As described above, based on the separation between the mirrors 352, 354, light from the indexing fiducial 310 may be transmitted to the camera in the zeroth-order reflection, but not in the first-order reflection, the second-order reflection, or the third-order reflection. It is understood that additional, unillustrated iterated reflections generated using the calibration system could be present in a calibration image captured by the camera (e.g., depending on the angle α of the first calibration target 330 relative to the mirrors 352, 354). For example, fourth-order reflections, fifth-order reflections, sixth-order reflections, etc. may be captured in a calibration image (e.g., as illustrated and described with reference to FIG. 4F).

The iterated reflections illustrated in FIGS. 4A-4D may be used for intrinsic camera calibration. For example, the iterated reflections may converge on a vanishing point within the image (e.g., as illustrated and described with reference to FIG. 4F). Such a vanishing point may be used to identify an optical axis of the camera undergoing calibration. Further, by capturing multiple calibration images of the calibration system at various perspectives (e.g., various angles relative to the first calibration target 330 or the second calibration target 350) using a camera, and tracking the angular orientation of the camera for each captured calibration image, the angular relationship between pixels in camera-space for captured images can be calibrated. Calibration images at multiple camera perspectives may be captured by adjusting the angular and/or translational position of the camera using one or more stages (e.g., a rotation stage as shown and described with reference to FIGS. 5A-5D). Additionally or alternatively, distortion coefficients and/or distortion matrices may be determined using a series of calibration images captured at different perspectives. For example, a distortion map between pixels within images captured by the camera being calibrated can be generated. In some embodiments, the number of perspectives used to capture calibration images may be sufficient that an entire field of view of the camera can be calibrated.

The generated distortion map may be used to perform image compensation on images captured by the camera during run-time (i.e., when the camera is no longer being calibrated but is performing computer-vision based environmental analysis using captured images). Performing image compensation on images captured by the camera during run-time may include, for example, modifying images (e.g., using image processing algorithms) so the images more accurately reflect a surrounding scene or accounting for inherent distortions within the camera such that the precise locations/orientations of objects in a surrounding scene can be determined using the captured calibration image.

Additionally, the iterated reflections may be used to determine the angle α of the first calibration target 330 relative to the mirrors 352, 354. This can be done by comparing two different iterated reflections within a calibrated image. For example, as illustrated in FIG. 4B, the first-order reflection includes one reflection of the light signals from the fiducials from the mirrors 352, 354 and one additional reflection of the light signal from the fiducials from the first mirror 302 of the first calibration target 330. The second-order reflection illustrated in FIG. 4C, however, includes an additional reflection off of the mirrors 352, 354 and an additional reflection off of the first mirror 302 of the first calibration target 330. Because the second-order reflection includes an additional set of reflections, the angle α has been applied to the light signals from the fiducials in the second-order reflection twice, whereas the angle α has only been applied to the light signals from the fiducials once in the first-order reflection. Hence, by comparing the pixel locations of same fiducials in the first-order reflection and the second-order reflection, the angle α can be backed out.

Figure 4E:
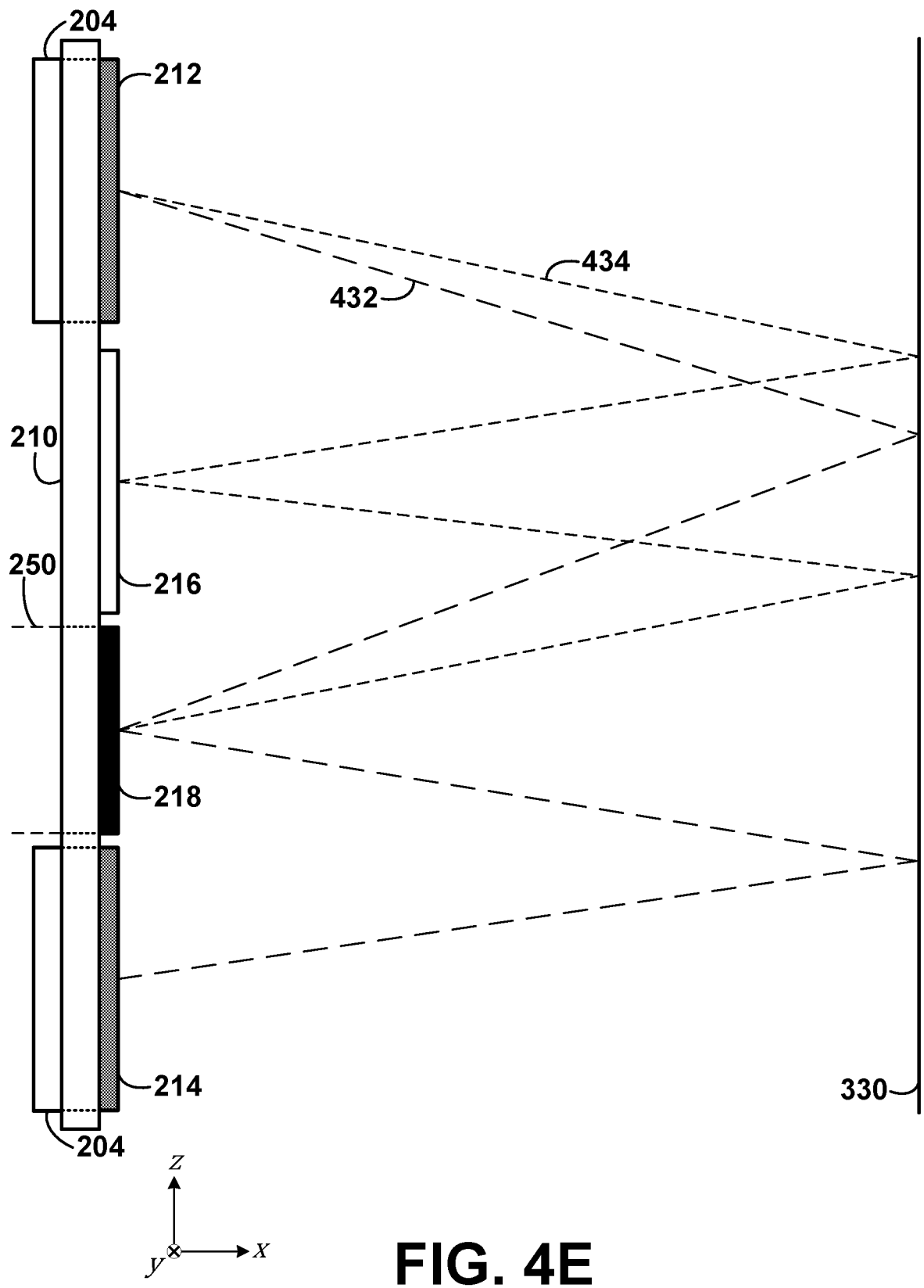
FIG. 4E is a side-view illustration of a mount and multiple reflections from a first calibration target, according to example embodiments.
Figure 4F:
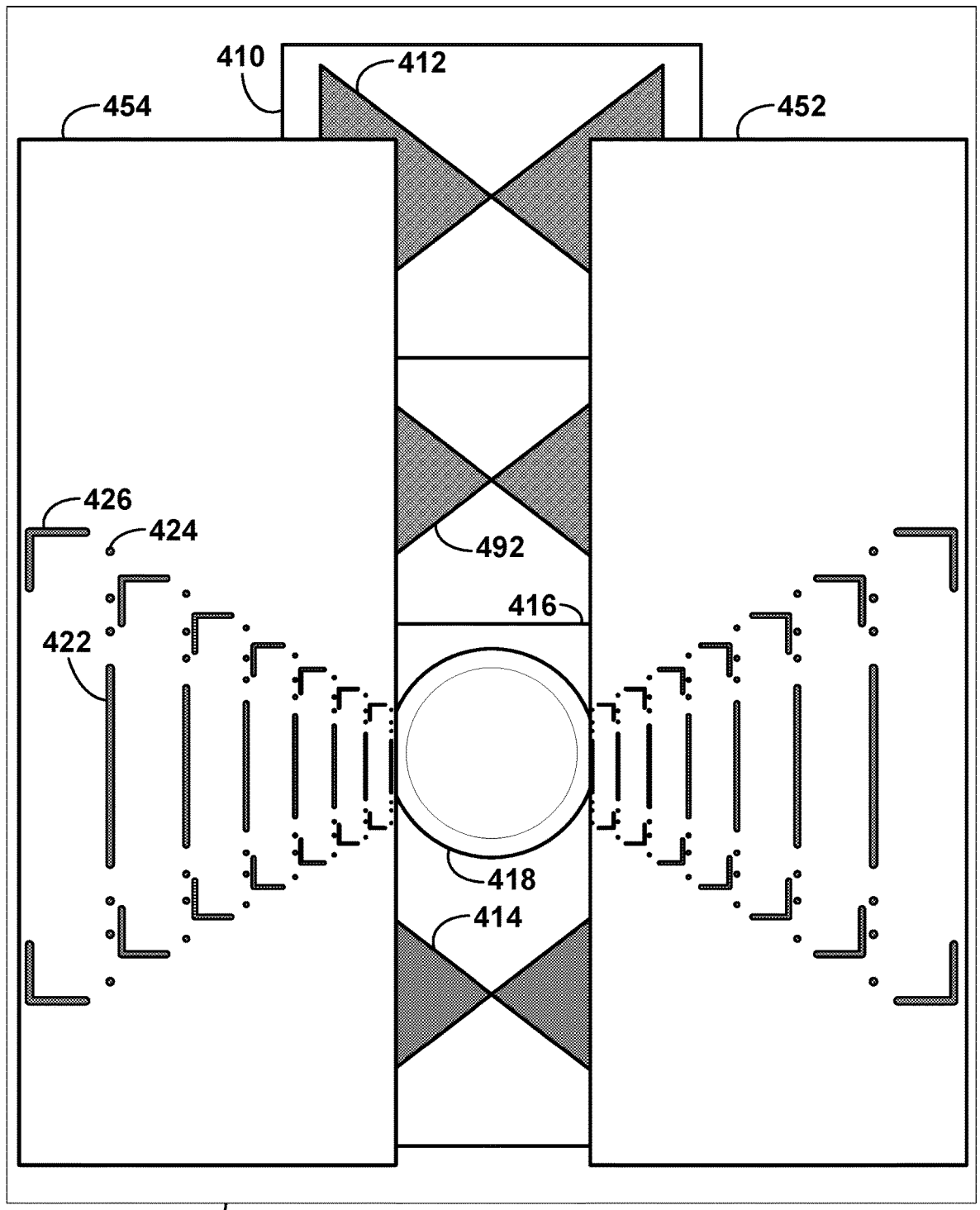
FIG. 4F is an illustration of a captured calibration image, according to example embodiments.

The series of iterated reflections may appear as an "infinite hallway" that converges on a vanishing point (e.g., as illustrated in FIG. 4F). By analyzing the radius of curvature of that apparent infinite hallway (e.g., using an image processing algorithm), the angle α of the first calibration target 330 relative to the mirrors 352, 354 may be determined. Once determined, the angle α may be accounted for when performing other steps in the camera calibration process (e.g., when determine the relative angular positions of pixels within an image and/or when determining distortion coefficients and/or a distortion matrix for the camera). In a similar way, a pitch angle of the calibration target 330 relative to the mirrors 352, 354 (i.e., a rotation of the first calibration target 330 about the y-axis illustrated in FIGS. 3C and 3D) could be determined. For example, a downward or upward curvature of the apparent infinite hallway in a captured calibration image (rather than a leftward or rightward curvature) could be used to identify pitch angle of the calibration target 330.

FIG. 4E is a side-view illustration of the mount 210 and multiple reflections from the first calibration target 330, according to example embodiments. Using the techniques described above, the calibration system may be used to perform intrinsic camera calibration. Additionally or alternatively, though, the calibration system may be used to perform extrinsic calibration of the camera (i.e., to determine a mapping between points in camera-space and points in physical-space). "Camera-space" being the two-dimensional coordinate system that defines pixel locations within images captured by the camera and "physical-space" being the two-dimensional or three-dimensional coordinate system that defines physical locations within the environment surrounding the camera. Performing an extrinsic calibration may include mapping the positions of specific points (e.g., mechanical datums) on the mount 210 to camera-space (i.e., pixel coordinates within captured images) using captured calibration images. For example, a centerpoint of the first camera-orientation fiducial 212 and/or a centerpoint of the second camera-orientation fiducial 214 may be identified in camera-space to determine mechanical datums associated with the mount 210 (e.g., aperture locations, screw locations, fiducial locations, pin locations, etc.).

One technique of performing extrinsic calibration may include capturing a calibration image (e.g., using the calibration system illustrated in FIG. 3C or 3D). Then, a mapping between camera-space and physical-space can be determined by: (1) performing image analysis on the captured calibration image by, for example, comparing a pixel location of an optical axis of the camera (e.g., pointing direction as previously determined by intrinsic camera calibration) to the pixel location of centerpoints of the camera-orientation fiducials 212, 214 within the calibration image and (2) comparing the determined pixel locations to predetermined distances of the mechanical datums relative to the camera lens (e.g., based on the design specifications of the mount 210 and components of the mount 210).

As illustrated in FIG. 4E, a light signal from the first camera-orientation fiducial 212 may be transmitted to the camera (e.g., via the lens 218) via a direct path 432 or an indirect path 434. The direct path 432, as illustrated, may include a reflection from the first mirror 302 of the first calibration target 330. The indirect path 434, as illustrated, may include two reflections from the first mirror 302 of the first calibration target 330 and a reflection from the mount mirror 216 on the mount 210. Hence, because light traveling the indirect path 434 undergoes an additional reflection from the first calibration target 330 when compared with light traveling the direct path 432, any offset of the first camera-orientation fiducial 212 within a captured calibration image resulting from an angle of the first calibration target 330 about the pitch axis will be doubled for light signals traveling via the indirect path 434 when compared with the direct path 432. As described below with reference to FIGS. 5A-6D, such a doubling effect can be used to identify/account for manufacturing imprecisions in the mount 210.

FIG. 4F is an illustration of a captured calibration image 400, according to example embodiments. The calibration image 400 may be captured by a camera mounted in a mount (e.g., the mount 210 illustrated in FIGS. 2A and 2B) when the mount is positioned within a calibration system (e.g., the calibration system illustrated in FIGS. 3C and 3D). As illustrated, the calibration image 400 may include a mount image 410, a first camera-orientation fiducial image 412, a second camera-orientation fiducial image 414, a mount mirror image 416, a lens image 418, second calibration target mirror images 452, 454, line fiducial images 422 (including iterated reflections of line fiducials), dot fiducial images 424 (including iterated reflections of dot fiducials), framing fiducial images 426 (including iterated reflections of framing fiducials), and a first camera-orientation fiducial reflection image 492.

Figure 4G:
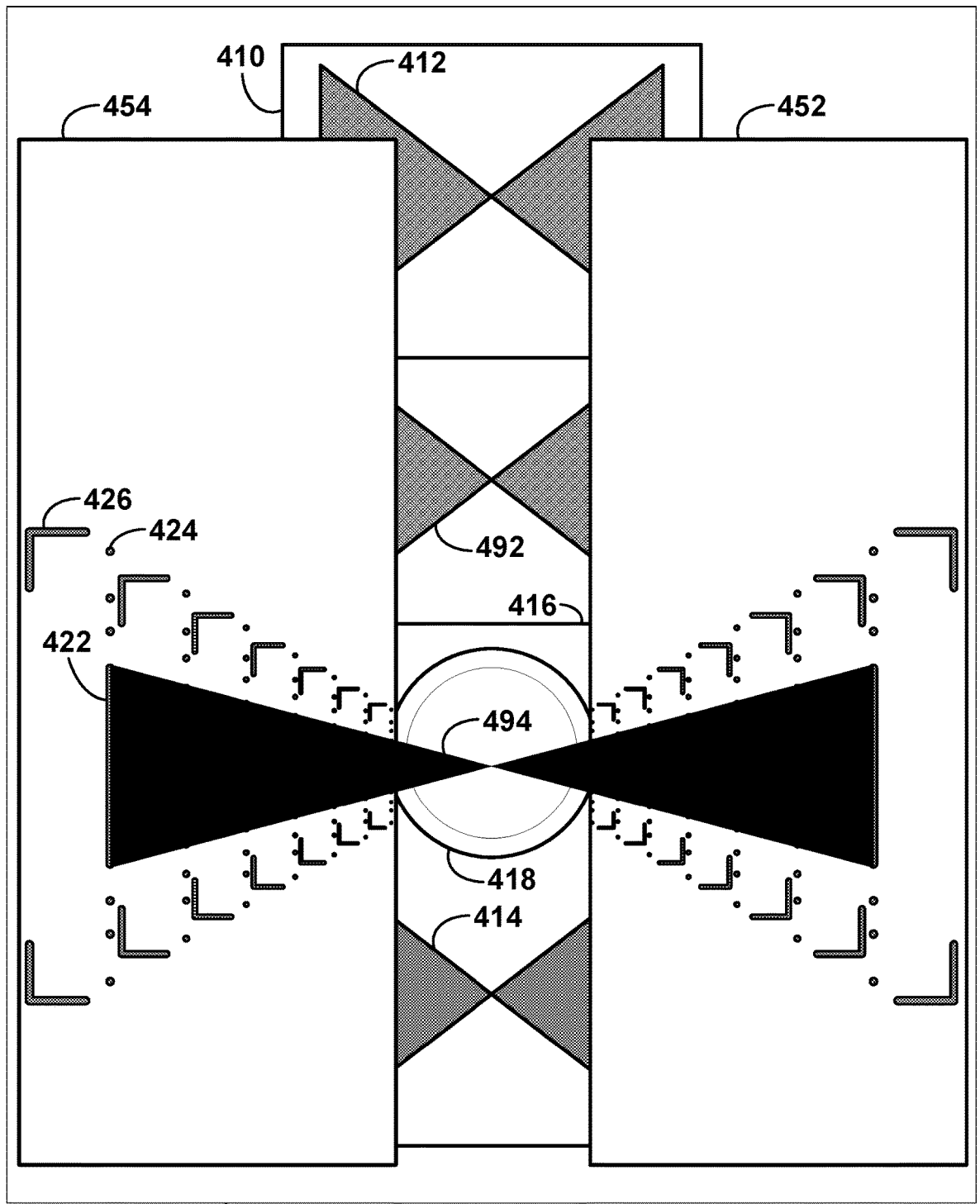
FIG. 4G is an illustration of a convergence pattern within a captured calibration image, according to example embodiments.
Figure 4H:
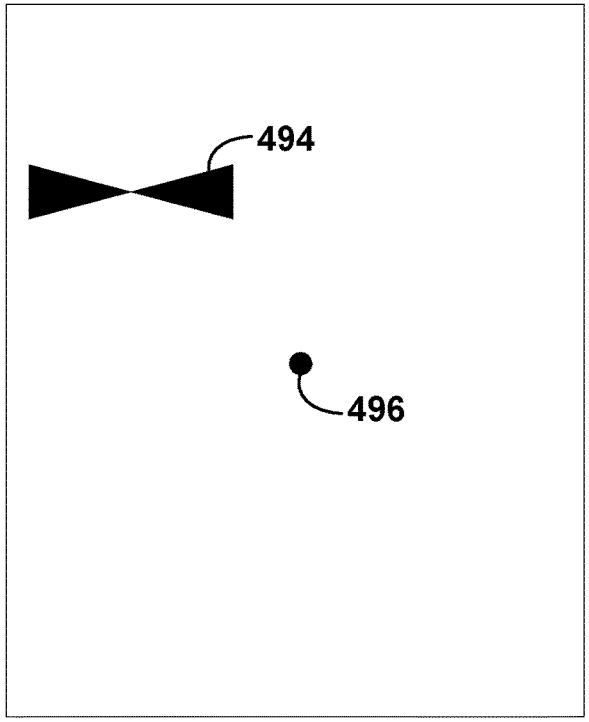
FIG. 4H is an illustration of a convergence pattern within a captured calibration image, according to example embodiments.
Figure 4I:
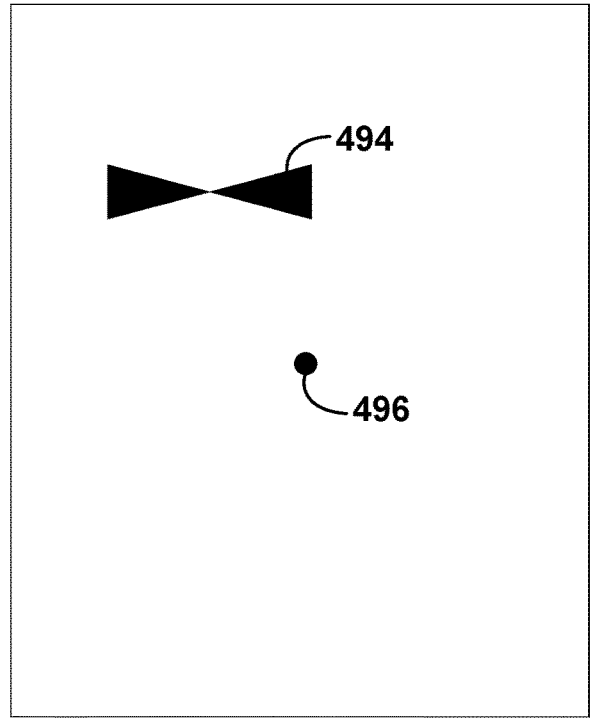
FIG. 4I is an illustration of a convergence pattern within a captured calibration image, according to example embodiments.
Figure 4J:
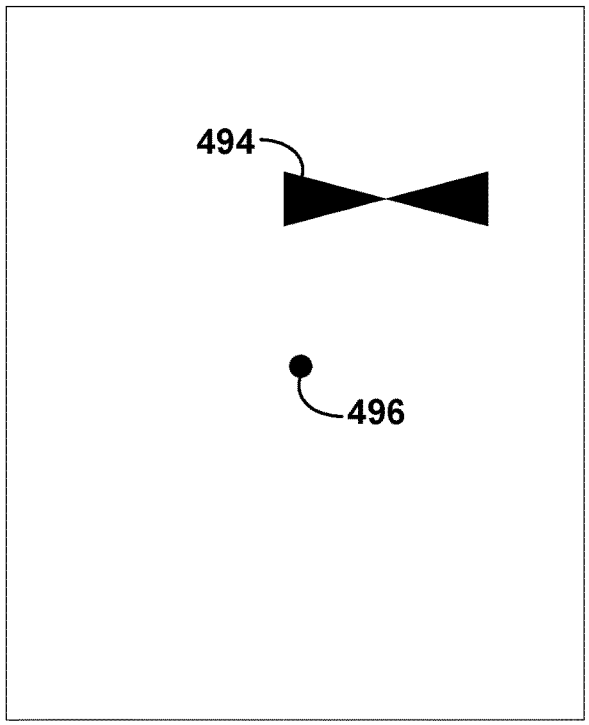
FIG. 4J is an illustration of a convergence pattern within a captured calibration image, according to example embodiments.
Figure 4K:
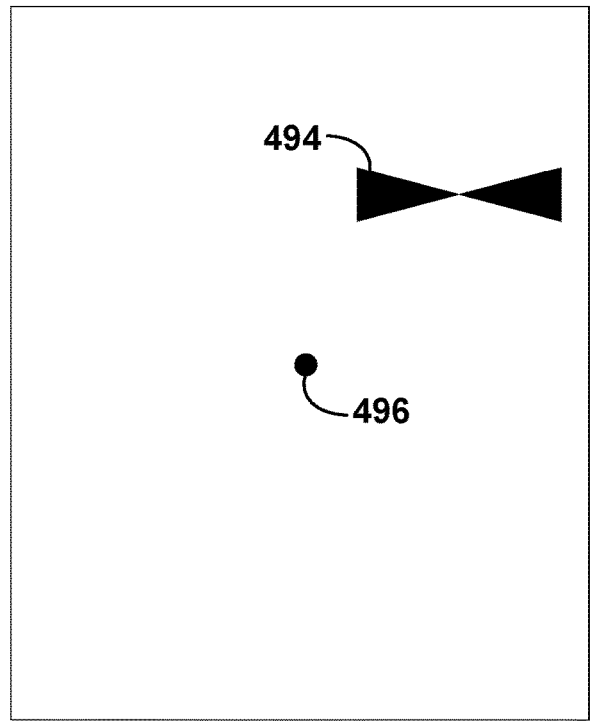
FIG. 4K is an illustration of a convergence pattern within a captured calibration image, according to example embodiments.

As described above, an apparent infinite hallway may be generated by the iterated reflections (e.g., by the iterated reflections of the line fiducials 322, dot fiducials 324, and/or framing fiducials 326). As also described above, the iterated reflections/the apparent infinite hallway may converge on a vanishing point. The apparent infinite hallway 494 with associated vanishing point is denoted in FIG. 4G. By forming a convex hull using the top and bottom points of each of the iterated line fiducial images 422, filling in the interior space, and extrapolating the iterated line fiducials into the region of the calibration image 400 between the second calibration target mirror images 452, 454, the apparent infinite hallway 494 may be formed. As illustrated in FIG. 4G, the apparent infinite hallway 494 may have a bowtie shape. Additionally or alternatively, the apparent infinite hallway 494 may be generated using one or more points associated with one or more of the iterated dot fiducial images 424 and/or using one or more points associated with one or more of the iterated framing fiducial images 426.

As also illustrated in FIG. 4G, the apparent infinite hallway 494 converges on a vanishing point someone in the vicinity of the lens image 418. The calibration image 400 may be used to calibrate for the pixel position in camera-space of the vanishing point of the apparent infinite hallway 494. For example, a pixel position of the optical axis (i.e., pointing direction) of the camera being calibrated may be determined (e.g., using a technique described below with reference to FIGS. 6A-6D). Then, by identifying the orientation (e.g., in yaw and roll, i.e., field angle and clocking angle) of the mount 210/camera when the vanishing point exactly overlays the optical axis, an angular orientation of the camera when the optical axis is aligned with the calibration system can be determined. Thereafter, the camera orientation (e.g., in yaw and/or roll, i.e., in field angle and/or clocking angle) may be modified (e.g., by modifying the position of one or more stages configured to position the mount 210). After modifying the camera orientation, an additional calibration image may be captured. In the additional calibration image, the vanishing point of the apparent infinite hallway 494 may occur at a different pixel position within the image. Using the amount the camera orientation was modified (e.g., the change in field angle and/or clocking angle applied between when the first calibration image was captured and when the additional calibration image was captured), the pixel location of the vanishing point in the additional calibration image can be related to the pixel location of the optical axis (e.g., by noting the difference in field angle/clocking angle, as determined based on an adjustment of a corresponding stage or by analyzing the captured calibration images as described with reference to FIG. 6E). It is understood that, in alternate embodiments, rather than using a stage to adjust the position of the camera relative to the calibration targets, the position of the calibration targets may be adjusted relative to the camera (e.g. using one or more stages) to achieve the same result.

In order to find an angular relationship between a multitude of pixel locations and the pixel location corresponding to the optical axis, a series of calibration images can be captured at a corresponding series of orientations (e.g., field angles and clocking angles) of the camera. FIGS. 4H-4K illustrate four possible pixel locations of vanishing points within the image. Also illustrated, for reference, in FIGS. 4H-4K is the pixel location of the optical axis 496 of the camera. In some embodiments, the pixel location of the optical axis 496 may be located at or near the center of images captured by a camera. It is understood that even though only the apparent infinite hallway 494 and the pixel location of the optical axis 496 is illustrated within FIGS. 4H-4K, this is done to avoid clutter. In reality, various components of the calibration image 400 illustrated in FIG. 4G (e.g., the mount image 410, the first camera-orientation fiducial image 412, the second camera-orientation fiducial image 414, the mount mirror image 416, the lens image 418, the second calibration target mirror images 452, 454, the line fiducial images 422 (including iterated reflections of line fiducials), the dot fiducial images 424 (including iterated reflections of dot fiducials), the framing fiducial images 426 (including iterated reflections of framing fiducials), and the first camera-orientation fiducial reflection image 492) may also be reproduced in the calibration images of FIGS. 4H-4K (albeit in different locations within the respective images than illustrated in FIG. 4G). Each of the pixel locations of the vanishing points in FIGS. 4H-4K may correspond to a related set of angular orientations of the camera. The angular relationships between the various pixel locations and the pixel location corresponding to the optical axis may be stored as calibration data (e.g., within a calibration matrix). For example, such calibration data may be stored within a non-transitory, computer-readable medium (e.g., a memory of the camera being calibrated).

In order to calibrate for a range of pixel locations within the field of view of the camera (i.e., within images captured by the camera), the camera may be swept across a range of field angles and/or clocking angles (e.g., to tile the apparent infinite hallway 494 across camera-space). In some embodiments, as the camera is swept across the combinations of field angles and/or clocking angles, the bowtie shape of the apparent infinite hallway 494 may be two-dimensionally rotated within one calibration image when compared to another calibration image. The granularity with which different field angles and/or clocking angles of the camera are selected for calibration may correspond to a desired pixel calibration resolution of the calibration data (e.g., based on the resolution of the image sensor of a camera in megapixels). Pixel locations which are not calibrated for using this calibration process may be determined using interpolation or extrapolation, for example.

Using the calibration data for each of the pixel locations, it is possible to determine the angular relationship of the calibrated pixel locations relative to the pixel location of the optical axis 496 and to compare the angular relationship of multiple calibrated pixel locations to one another. For example, the angular relationship of two pixel locations corresponding to the vanishing points of the respective apparent infinite hallways 494 illustrated in FIG. 4L can be compared using the calibration data.

Figure 4L:
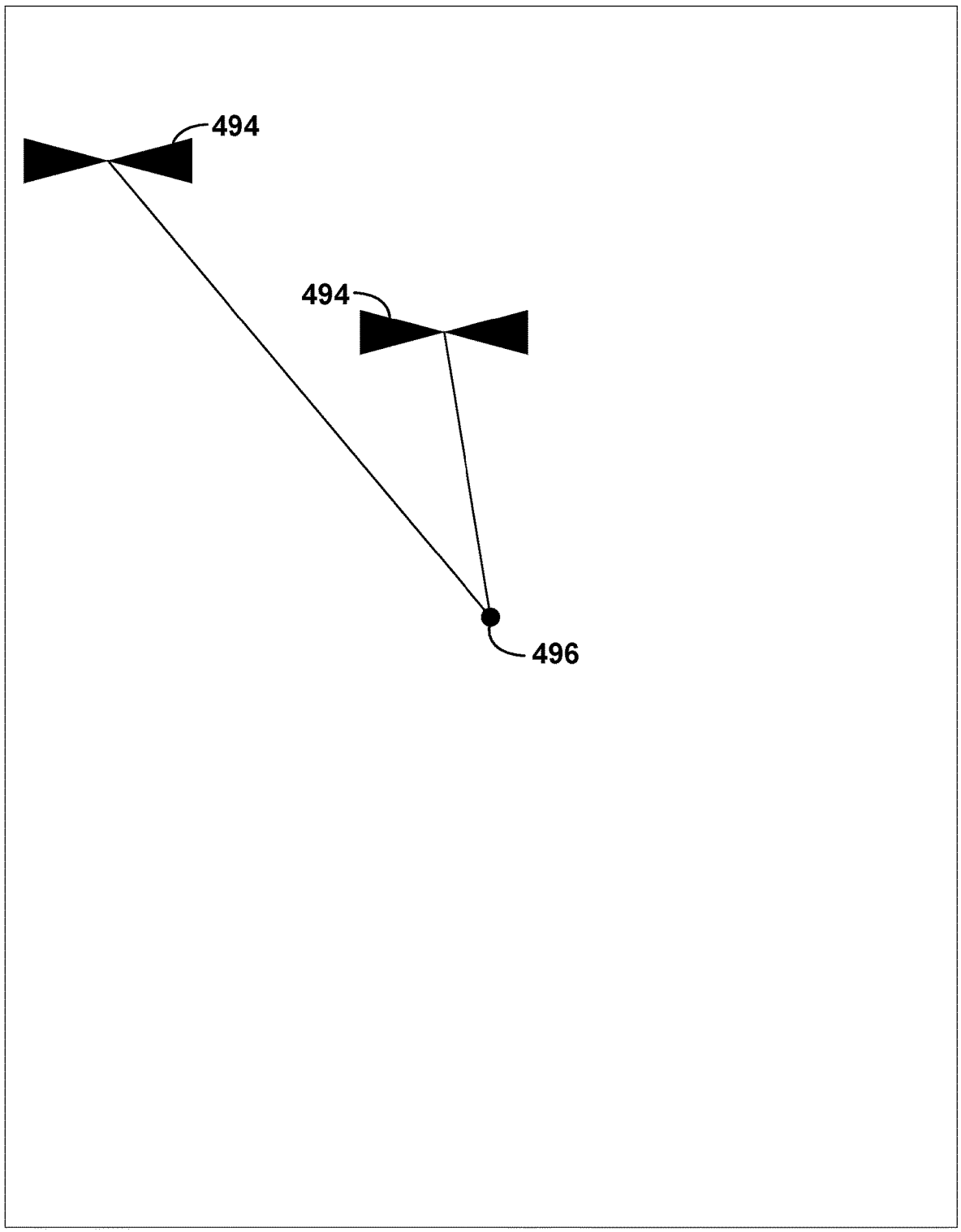
FIG. 4L is an illustration of a composite image including multiple convergence patterns, according to example embodiments.
Figure 4M:
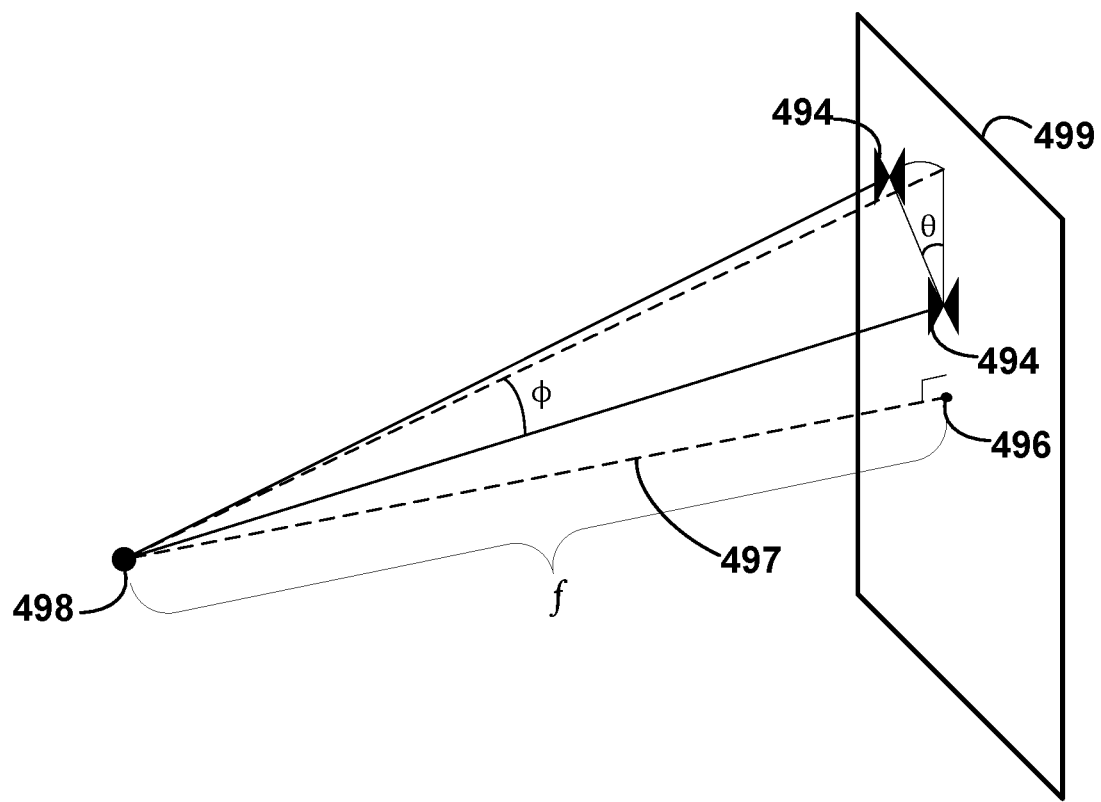
FIG. 4M is an illustration of a relative angular mapping between pixels, according to example embodiments.
Figure 5A:
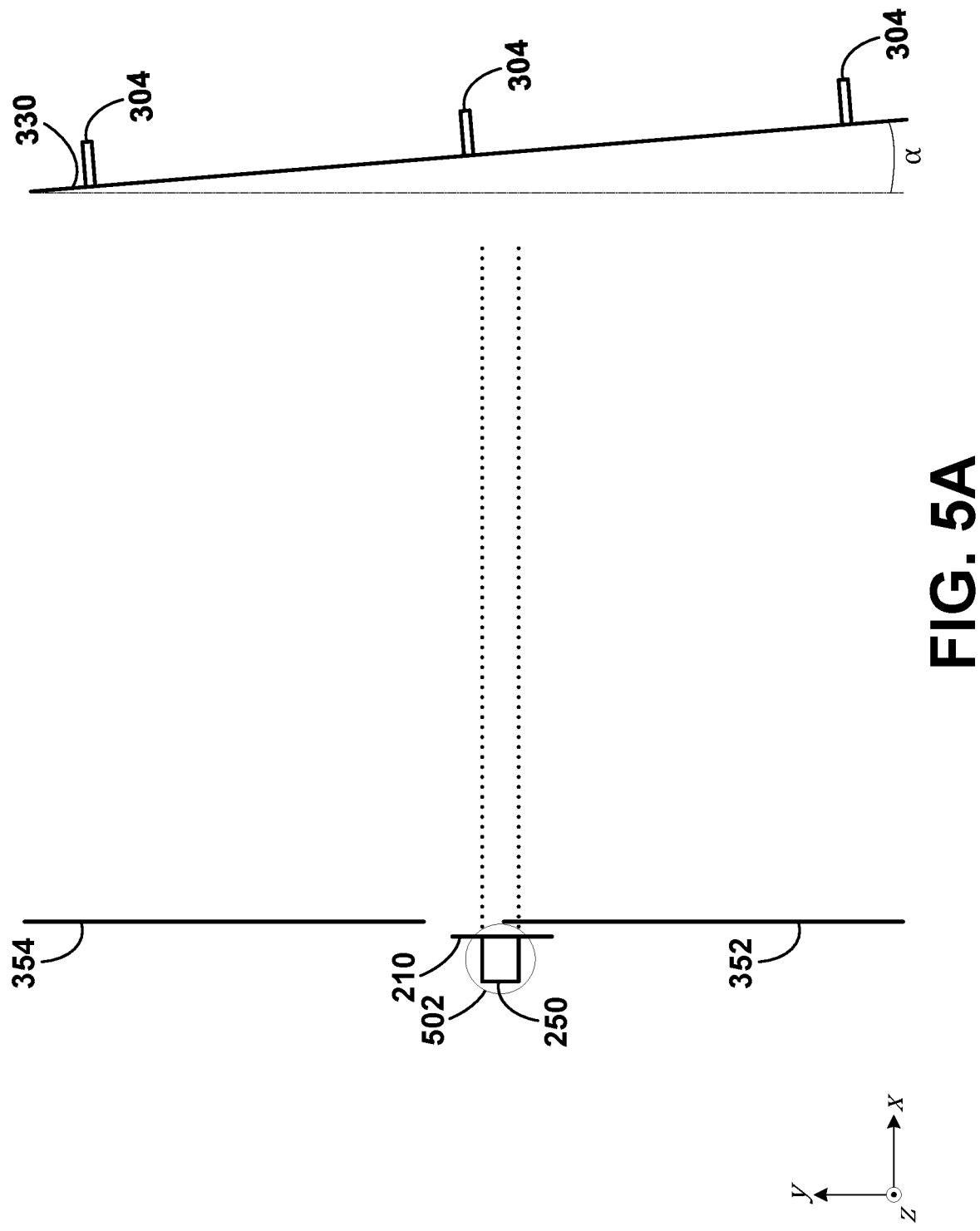
FIG. 5A is a top-view illustration of a calibration system, according to example embodiments.
Figure 5B:
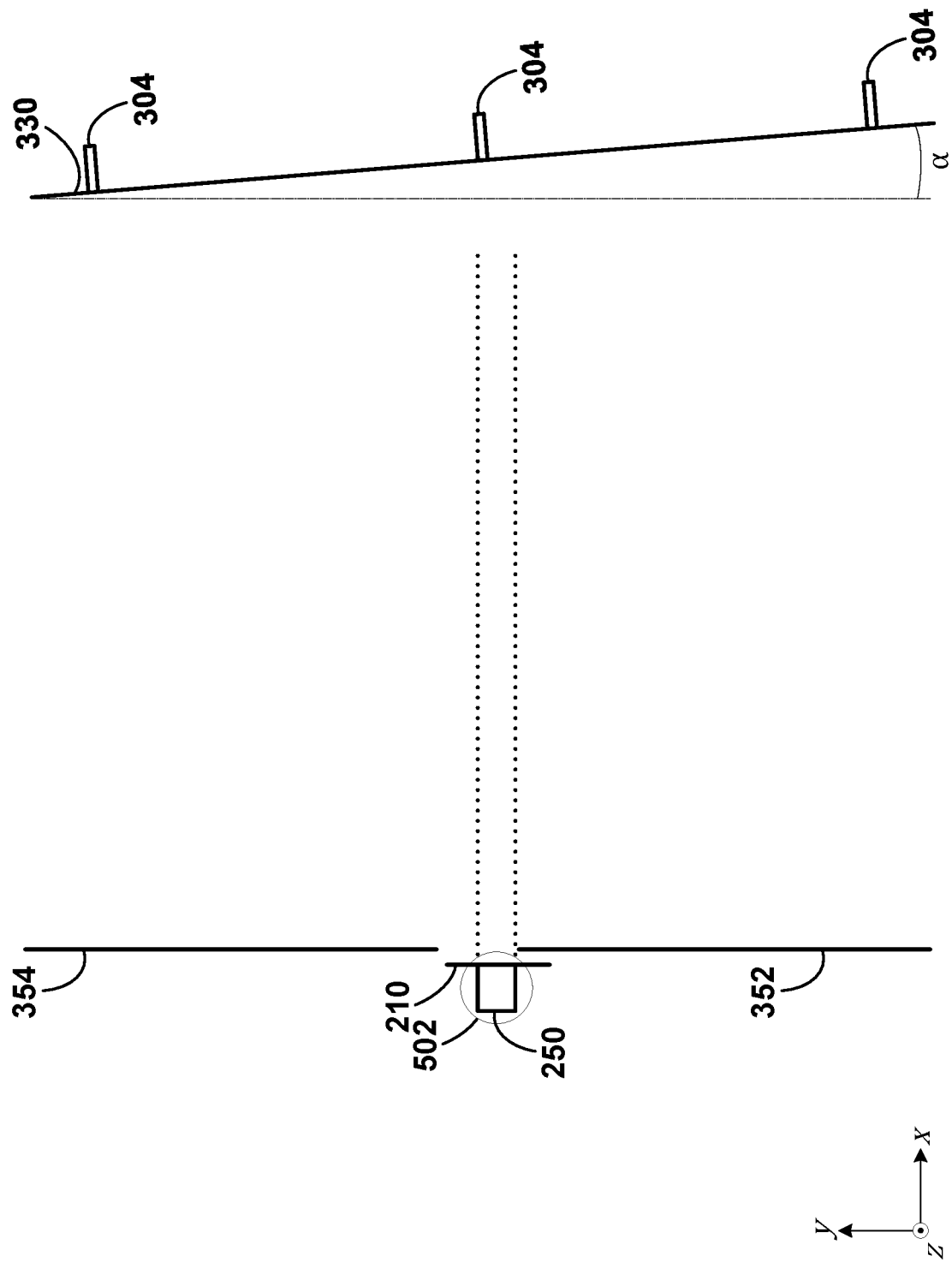
FIG. 5B is a top-view illustration of a calibration system, according to example embodiments.
Figure 5D:
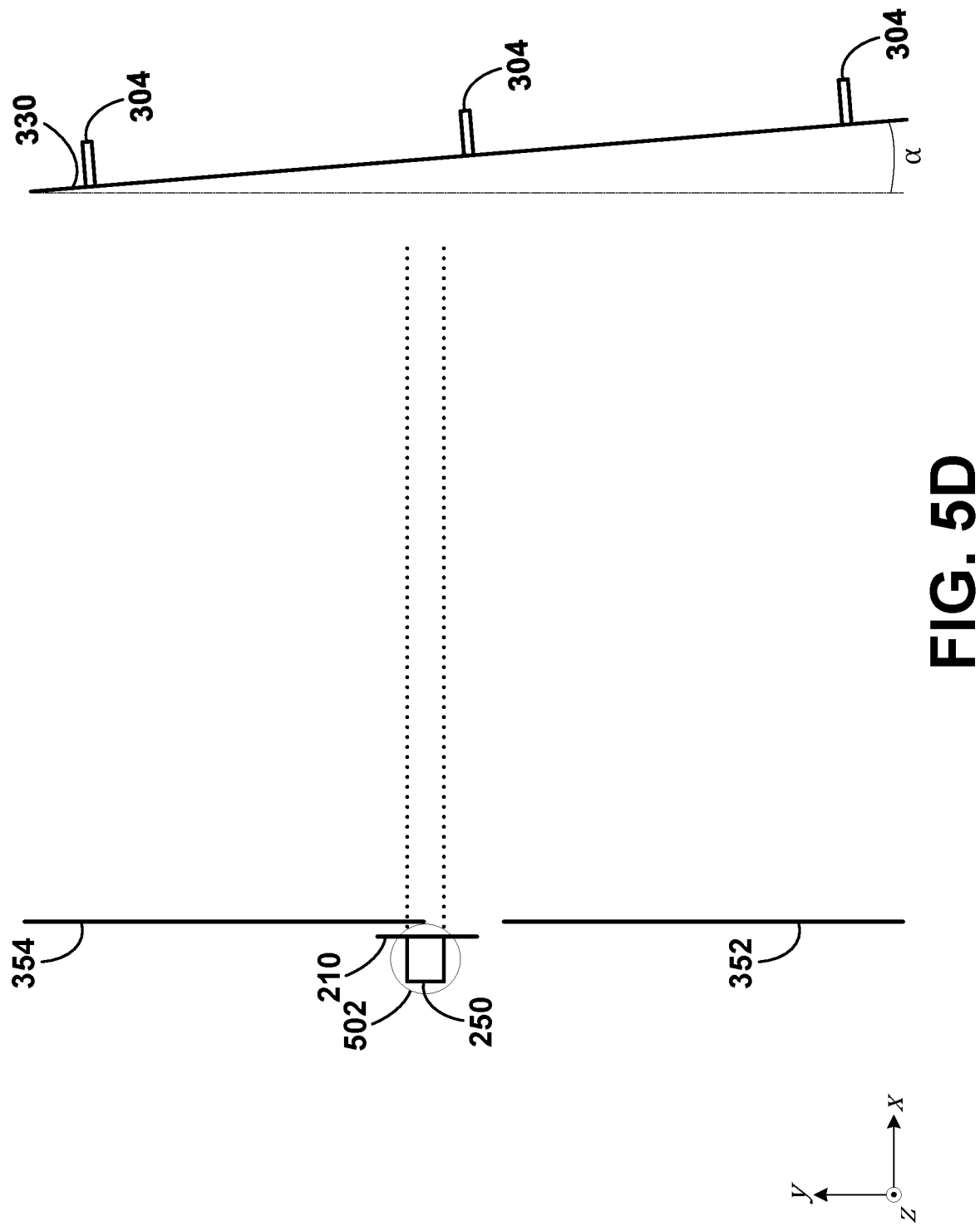
FIG. 5D is a top-view illustration of a calibration system, according to example embodiments.

FIG. 4M is a three-dimensional illustration of the angular relationship between the two pixel locations corresponding to the vanishing points of the respective apparent infinite hallways 494 illustrated in FIG. 4L. In FIG. 4M, the pixel location of the optical axis 496, the projection center of the camera 498 and the image plane 499 are illustrated. As shown, the imaging plane 499 is separated from the projection center of the camera 498 by the focal length f of the camera (e.g., the focal length f depending upon the lens arrangement included in the camera). An optical axis 497 is also illustrated. The optical axis 497 connects the projection center of the camera 498 and the pixel location of the optical axis 496 and is perpendicular to the image plane 499. Also illustrated in FIG. 4M is the difference in field angle $\phi$ and clocking angle $\theta$ between the pixel locations corresponding to the vanishing points of the apparent infinite hallways 494 illustrated in FIG. 4L. Such a characterization of the angular relationship between the various pixel locations may be part of an intrinsic calibration procedure, as described herein.

In addition to performing intrinsic calibration, performing extrinsic calibration, and determining an angle α (e.g., in yaw or, additionally or alternatively, in pitch) of the first calibration target 330 relative to the second calibration target 350, the calibration system may also be used to detect any imperfections within the mount. For example, fabrication imperfections (e.g., due to machining tolerances) present within the mount 210 may be identified using a series of captured calibration images. In some embodiments, the series of calibration images captured using the camera and the calibration system described herein may be used to identify and account for rotation of a surface of the mount mirror 216 relative to the mount 210 (e.g., in the pitch and/or yaw directions). Rotations of the surface of the mount mirror 216 relative to the mount 210 in the pitch and/or yaw directions may be intentional. Alternatively, rotation of the mount mirror 216 relative to the mount 210 in the pitch and/or yaw directions may result from inherent imprecision in the fabrication of the mount 210 (e.g., due to machining tolerances).

A series of positions of the camera used to capture a corresponding series of calibration images is illustrated in FIGS. 5A-5D. FIGS. 5A-5D are each top-views of the calibration system (e.g., viewed from a perspective normal to the z-axis similar to FIGS. 3C-4D). As illustrated in FIGS. 5A-5D, the mount 210 and, correspondingly, the camera (including the camera body 250) may be positioned in different locations relative to the mirrors 352, 354 and the first calibration target 330 in order to capture the series of calibration images. The mount 210/camera may be positioned in the various locations using a stage 502. The stage 502 may be configured to rotate and/or translate the mount 210 and the camera. Further, in some embodiments, the stage 502 may be controlled by a computing device (e.g., a controller). Although FIGS. 5A-5D illustrate various translational locations of the mount 210/camera, it is understood that a similar detection of imperfections within the mount 210 could also be accomplished using a set of rotationally varying positions of the mount 210/camera or a set of rotationally and translationally varying positions of the mount 210/camera.

Figure 6A:
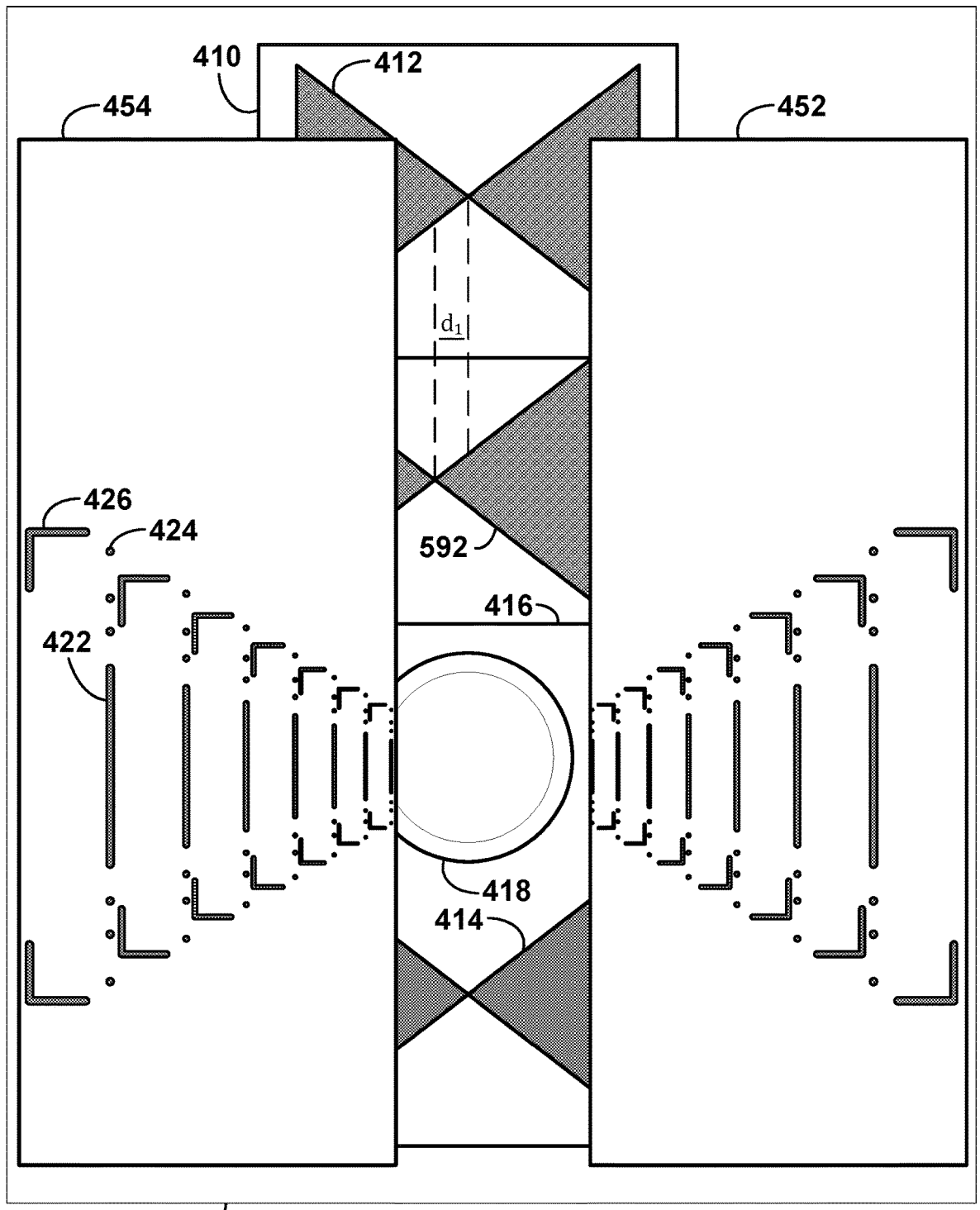
FIG. 6A is an illustration of a captured calibration image, according to example embodiments.
Figure 6B:
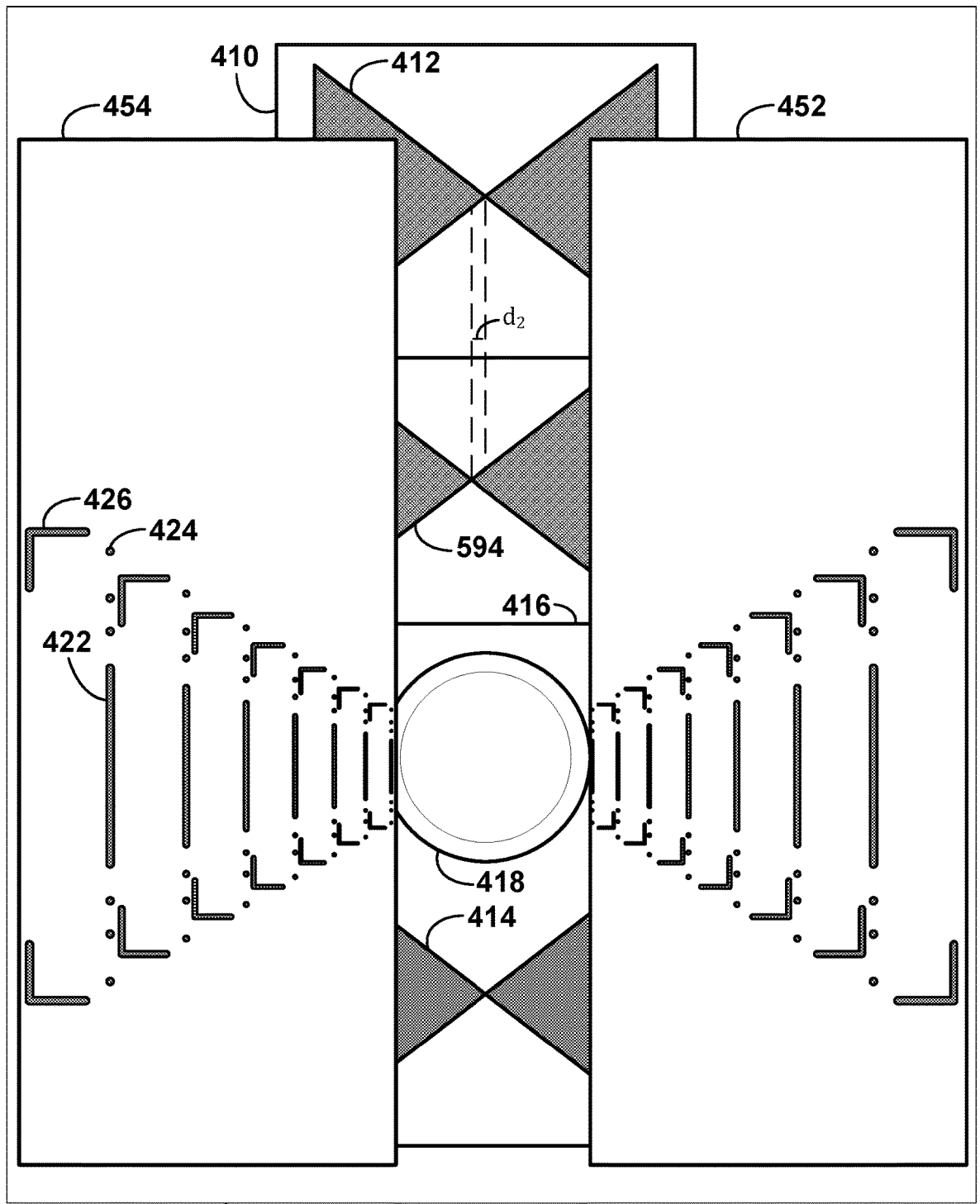
FIG. 6B is an illustration of a captured calibration image, according to example embodiments.
Figure 6C:
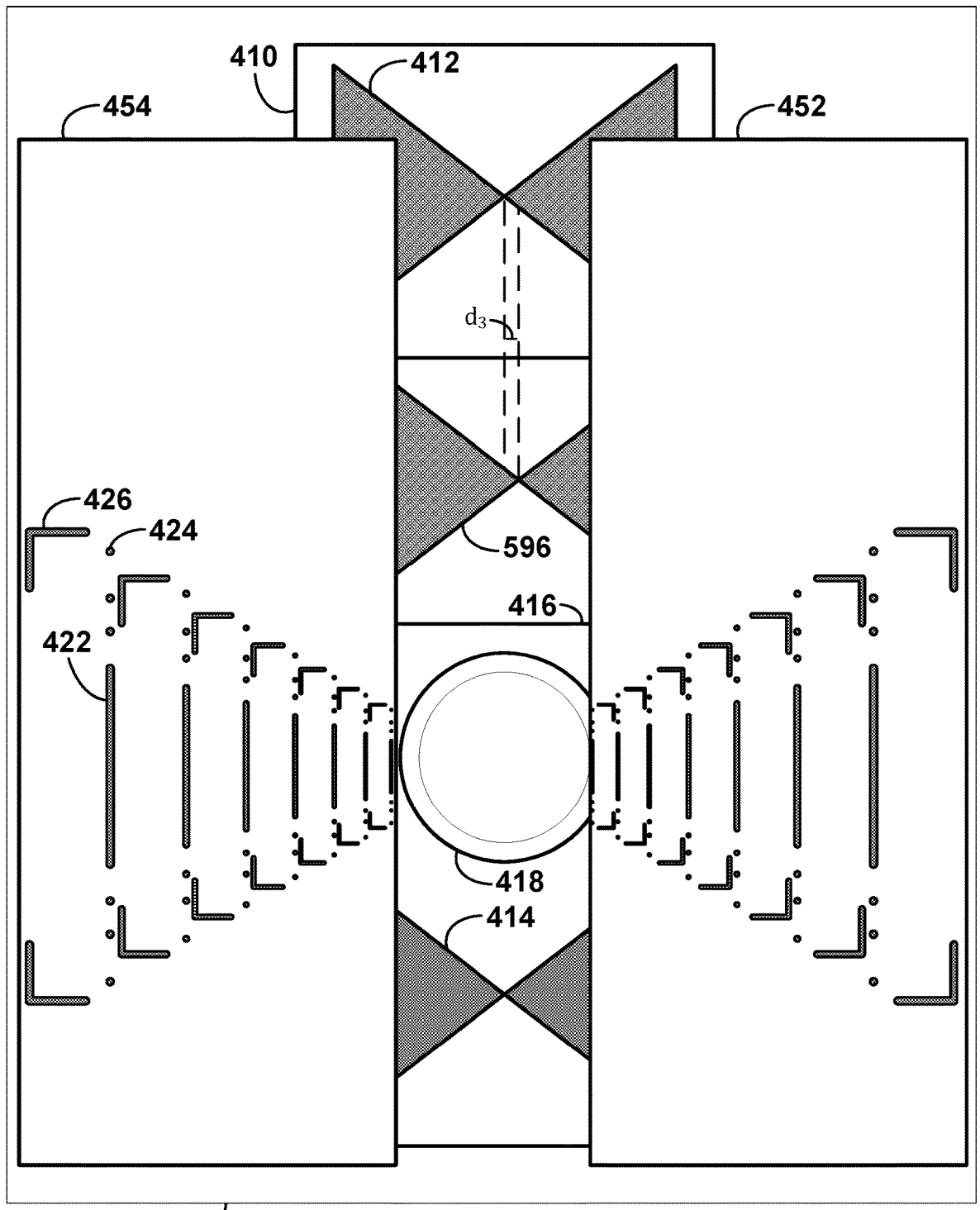
FIG. 6C is an illustration of a captured calibration image, according to example embodiments.
Figure 6D:
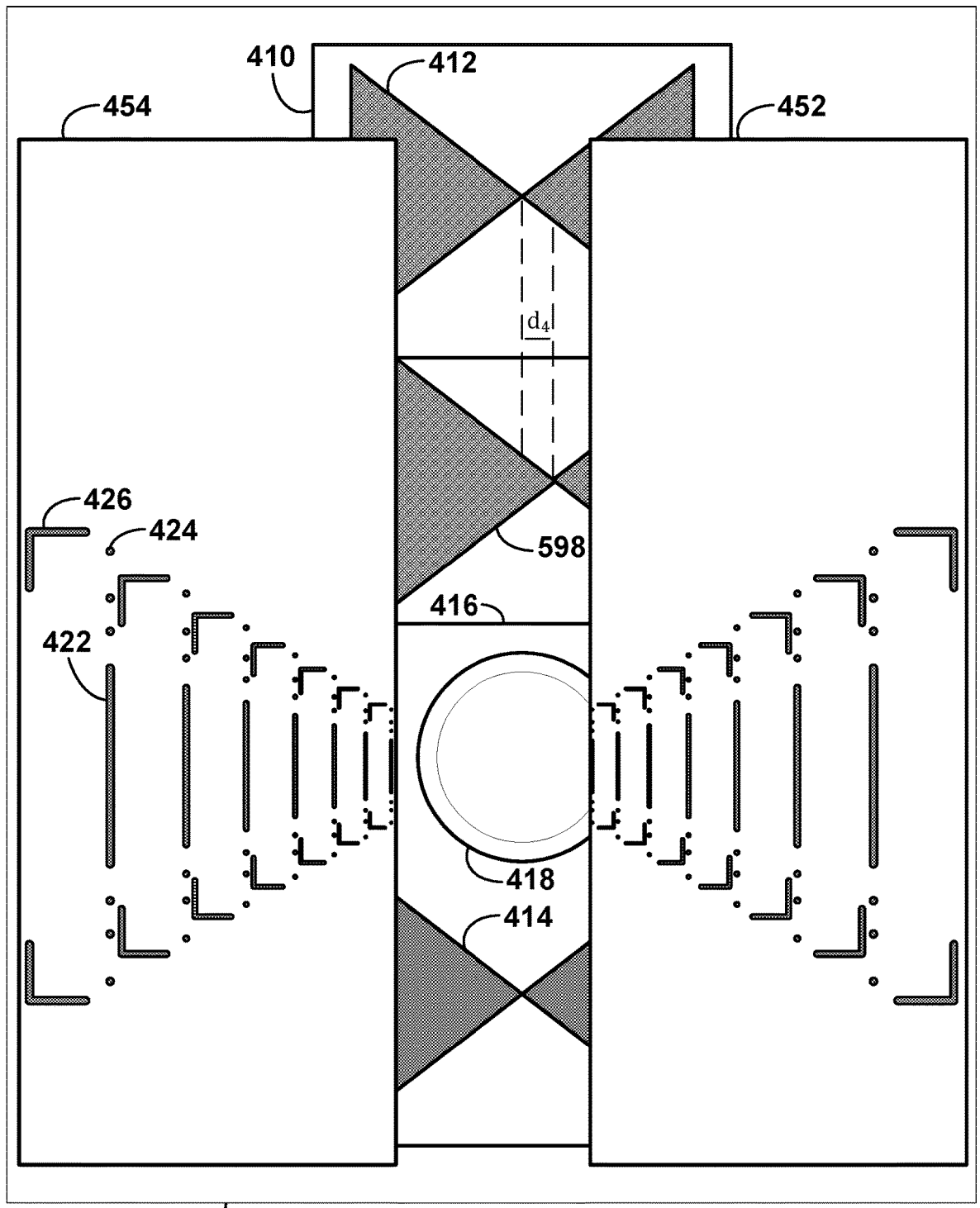
FIG. 6D is an illustration of a captured calibration image, according to example embodiments.

A calibration image may be captured from the perspective of the camera in each of FIGS. 5A-5D. FIGS. 6A-6D illustrate, respectively, example calibration images captured from the camera perspectives of FIGS. 5A-5D. For example, FIG. 6A illustrates a first calibration image 612 captured from the camera perspective in FIG. 5A. FIG. 6B illustrates a second calibration image 614 captured from the camera perspective in FIG. 5B. FIG. 6C illustrates a third calibration image 616 captured from the camera perspective in FIG. 5C. FIG. 6D illustrates a fourth calibration image 618 captured from the camera perspective in FIG. 5D.

As illustrated in FIGS. 6A-6D, the position of the mount image 410 relative to the second calibration target mirror images 452, 454 may be different in each of calibration images 612, 614, 616, 618. The series of calibration images 612, 614, 616, 618 can be used to determine various spatial characteristics of the calibration system, itself (e.g., in addition to being used to determine angular positions of vanishing points at various pixel locations). For example, if the mount 210 is fabricated such that a centerpoint of the first camera-orientation fiducial 212, a centerpoint of the second camera-orientation fiducial 214, and a geometrical center of the lens 218 are vertically aligned with one another (e.g., along the z-direction), then the pixel difference in locations of centerpoints within a calibration image (e.g., the first calibration image 612) of the first camera-orientation fiducial image 412 and the first camera-orientation fiducial reflection image 598 can be used in conjunction with a pixel location of the centerpoint of the second camera-orientation fiducial image 414, as well as a pixel location of the geometric center of the first calibration image 612, in its entirety, to determine the current pointing angle (e.g., in field angle and roll angle) of the camera. Such a determination of the pointing angle of the pointing angle of the camera is illustrated using the vectors in FIG. 6E.

Figure 6E:
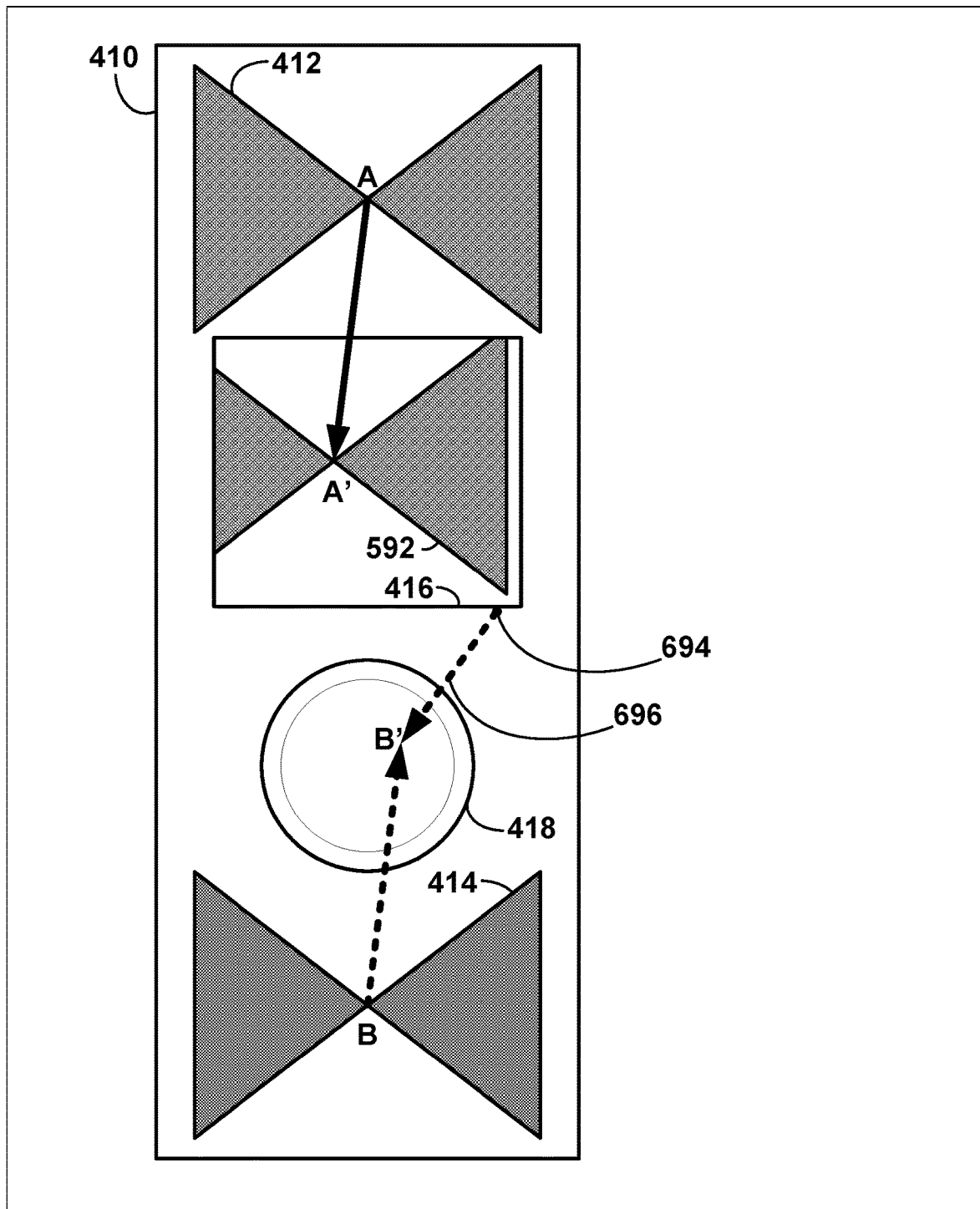
FIG. 6E is an illustration of a determination of spatial characteristics of a calibration system using a captured calibration image, according to example embodiments.

It is understood that, for illustrative purposes (e.g., to avoid cluttering the figure), FIG. 6E only shows the portions of the calibration image 692 corresponding to the mount image 410. In reality, the determination of pointing angle described herein may be performed using a complete calibration image (e.g., similar to the calibration images 612, 614, 616, 618) that includes second calibration target mirror images 452, 454, line fiducial images 422, dot fiducial images 424, framing fiducial images 426, etc. As illustrated in FIG. 6E, a vector $V_{A-A'}$ may be determined between the pixel locations of points A and A' (point A being the centerpoint of the first camera-orientation fiducial image 412 and point A' being the centerpoint of the first camera-orientation fiducial reflection image 592). Then, based on the pixel location of point B (point B being the centerpoint of the second camera-orientation fiducial image 414) and the vector $V_{A-A'}$, the location of the camera reflection within the calibration image 692 can be determined (i.e., by subtracting the vector $V_{A-A'}$ from the pixel location of point B). This point is labeled B' in FIG. 6E. Then, based on the geometric centerpoint of the calibration image 694 and point B' (and, in some embodiments, based on the focal length of the lens), a pointing vector 696 of the camera during the capture of the respective calibration image 692 may be determined.

Figure 7:
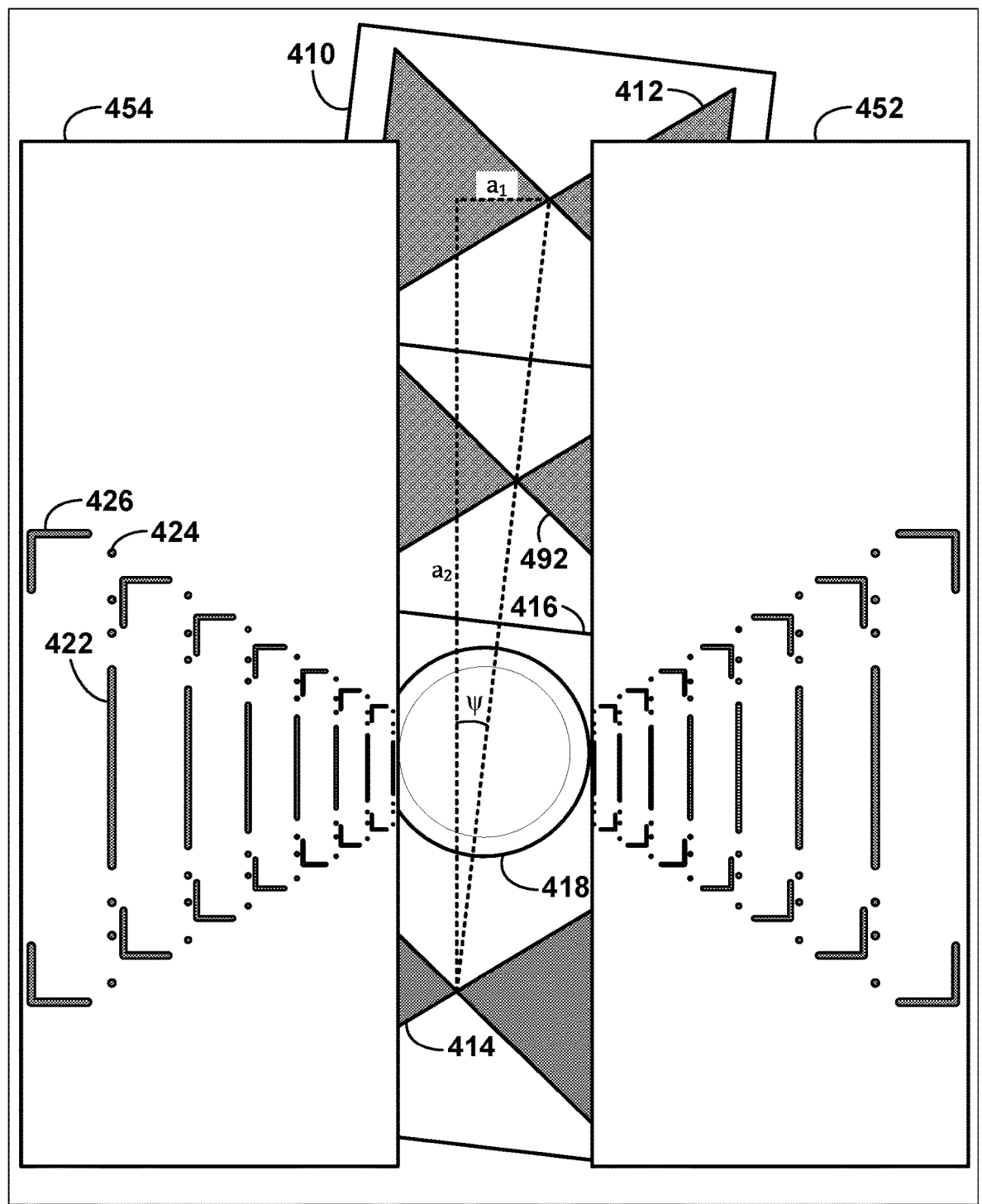
FIG. 7 is an illustration of a captured calibration image, according to example embodiments.

The roll angle of the mount 210 as captured by the calibration image 692 (i.e., the angle of the mount image 410 about the x-axis illustrated in FIG. 6E) can also be determined by taking the arctangent of the horizontal component (e.g., y-component in FIG. 6E) of the vector between pixel locations of points A and A' divided by the vertical component (e.g., z-component in FIG. 6E) of the vector between pixel locations of points A and A' (i.e., roll angle=arctan $(V_{A-A'y}/V_{A-A'z})$). Additionally or alternatively, and in a similar fashion (assuming the first camera-orientation fiducial 212 and the second camera-orientation fiducial 214 are vertically aligned (i.e., aligned along the z-axis illustrated in FIG. 2A)), a roll angle ($\Psi$, as illustrated in FIG. 7) of the mount 210 relative to the mirrors 352, 354 of the second calibration target 350 could be determined by taking the arctangent of the horizontal component (e.g., y-component in FIG. 7, labeled as $a_1$) of the vector separating the centerpoints of the first camera-orientation fiducial image 412 and the second camera-orientation fiducial image 414 divided by the vertical component (e.g., z-component in FIG. 7, labeled as $a_2$) of the vector separating the centerpoints of the first camera-orientation fiducial image 412 and the second camera-orientation fiducial image 414 (i.e., roll=arctan $(a_1/a_2)$).

If a calibration image happened to be captured where the pixel location corresponding to the current pointing angle of the camera (e.g., in field angle and clocking angle) matched up with the geometric center of the calibration image, the vanishing point generated by the respective apparent infinite hallway in the calibration image would precisely coincide with the pixel location of the optical axis for that calibration image.

In addition, within the mount image 410 portion of the calibration images 612, 614, 616, 618, each of the fiducials depicted in the mount image 410 may not vary by the same amount between calibration images 612, 614, 616, 618. As described above with reference to FIG. 4E, this may occur, for example, because light signals from the first camera-orientation fiducial 212 may take different paths to the camera (e.g., the direct path 432 or the indirect path 434), each path having a different number of reflections from the mount mirror 216 and the first calibration target 330 (e.g., light signals taking the direct path 432 being reflected once by the first mirror 302 of the first calibration target 330 and light signals taking the indirect path 434 being reflected twice by the first mirror 302 of the first calibration target 330 and once by the mount mirror 216). By comparing images of the first camera-orientation fiducial 212 arising from different light signal paths (e.g., direct vs. indirect) across multiple calibration images, and taking into account the previously determined angular rotation (e.g., in yaw and/or pitch) of the first calibration target 330, an angular offset of the mount mirror 216 (if any) can be determined.

As illustrated in the first calibration image 612 of FIG. 6A, there is a horizontal offset (e.g., an offset in the y-direction, as illustrated) between the first camera-orientation fiducial image 412 and a first camera-orientation fiducial reflection image 592 (based on the indirect path 434 involving a reflection from the mount mirror 216). The horizontal offset is labeled $d_1$ in FIG. 6A. Similarly, as illustrated in the second calibration image 614 of FIG. 6B, there is a horizontal offset (e.g., an offset in the y-direction, as illustrated), between the first camera-orientation fiducial image 412 and a second camera-orientation fiducial reflection image 594 (again based on the indirect path 434 involving a reflection from the mount mirror 216). The horizontal offset is labeled $d_2$ in FIG. 6B.

Even though the first camera-orientation fiducial image 412 is in a different pixel location in the second calibration image 614 when compared to the first calibration image 612 (e.g., based on the difference in orientation of the mount 210/camera relative to the first calibration target 330 and the second calibration target 350 when capturing the second calibration image 614 when compared to the first calibration image 612), the first camera-orientation fiducial image 412 may be in the same position relative to the mount image 410. This is not true of the first camera-orientation fiducial reflection image 592 and the second camera-orientation fiducial reflection image 594 (i.e., the second camera-orientation fiducial reflection image 594 is in a different location of the second calibration image 614 relative to the mount image 410 than the first camera-orientation fiducial reflection image 592 relative to mount image 410 in the first calibration image 612). Put a different way, the camera-orientation fiducial reflection image 592, 594 moved a greater distance between the first calibration image 612 and the second calibration image 614 than did the mount image 410, first camera-orientation fiducial image 412, the second camera-orientation fiducial image 414, the lens image 418, etc. (e.g., the camera-orientation fiducial reflection image 592, 594 moved twice as much because of the additional reflection from the first mirror 302 of the first calibration target 330 of the corresponding light signal from the first camera-orientation fiducial 212). As a result of this effect, as illustrated in FIGS. 6A and 6B, the horizontal offset $d_1$ may be greater than the horizontal offset $d_2$. Thus, by determining the difference in the horizontal offsets $d_1$ and $d_2$, comparing to the amount the mount 210/camera has rotated/translated between the capture of the first calibration image 612 and the second calibration image 614, and then subtracting any inherent misalignment (e.g., inherent angular offset from normal) between the mount 210 and the first mirror 302 of the first calibration target 330 (e.g., as previously determined, e.g., based on the angle of the first camera-orientation fiducial image 412 within a calibration image), an angle of the surface of the mount mirror 216 relative to the surface of the mount 210 may be determined.

Similar and/or additional comparisons to those described above may be performed using the calibration images 616, 618 and horizontal offsets $d_3$, $d_4$ illustrated in FIGS. 6C and 6D. Such additional comparisons may be performed for redundancy and/or to calibrate for alternate degrees of freedom (e.g., pitch offsets of the mount mirror 216, as opposed to yaw offsets of the mount mirror 216).

Even further, in addition to: (1) being used to determine angular positions of vanishing points at various pixel locations to determine intrinsic calibration; (2) determining extrinsic calibration using mechanical datums within calibration images; and (3) determining various spatial characteristics of the calibration system, the calibration system may also be used to determine additional inherent characteristics of the camera. For example, based on how in-focus or out-of-focus each of the series of iterated reflections is within a calibration image (e.g., based on how in-focus or out-of-focus the framing fiducial images 426 in the calibration image 400 of FIG. 4F are) and the corresponding imaging depth of each iterated reflection, a depth of field of the camera may be determined.

III. EXAMPLE PROCESSES

Figure 8A:
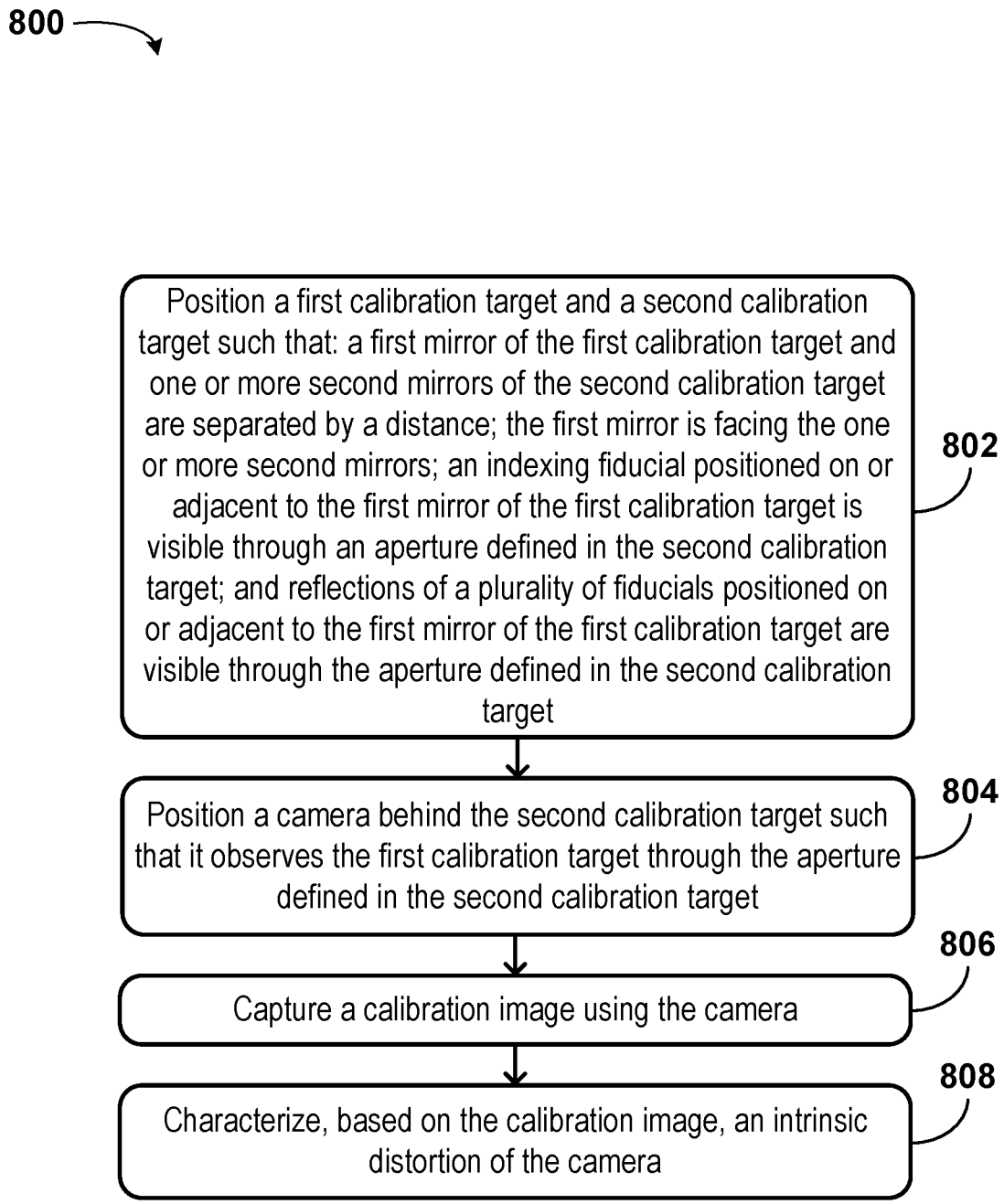
FIG. 8A is a flow chart illustration of a method, according to example embodiments.

FIG. 8A is a flowchart diagram of a method 800, according to example embodiments. In some embodiments, one or more of the blocks of FIG. 8A may be performed by a computing device (e.g., the computing device 106 illustrated in FIG. 1C). The computing device may include computing components such as a non-volatile memory (e.g., a hard drive or a read-only memory (ROM)), a volatile memory (e.g., a random-access memory (RAM), such as dynamic random-access memory (DRAM) or static random-access memory (SRAM)), a user-input device (e.g., a mouse or a keyboard), a display (e.g., a light-emitting diode (LED) display or a liquid-crystal display (LCD)), and/or a network communication controller (e.g., a WIFI® controller, based on IEEE 802.11 standards, or an Ethernet controller). The computing device, for example, may execute instructions stored on a non-transitory, computer-readable medium (e.g., a hard drive) to perform one or more of the operations contemplated herein.

At block 802, the method 800 may include positioning a first calibration target and a second calibration target such that: a first mirror of the first calibration target and one or more second mirrors of the second calibration target are separated by a distance; the first mirror is facing the one or more second mirrors; an indexing fiducial positioned on or adjacent to the first mirror of the first calibration target is visible through an aperture defined in the second calibration target; and reflections of a plurality of fiducials positioned on or adjacent to the first mirror of the first calibration target are visible through the aperture defined in the second calibration target. The reflections of the plurality of fiducials are iterated reflections resulting from at least one reflection by the one or more second mirrors and at least one reflection by the first mirror.

In some embodiments of block 802, positioning the first calibration target and the second calibration target may include positioning the first calibration target and the second calibration target such that reflections of the indexing fiducial are not visible through the aperture defined in the second calibration target.

At block 804, the method 800 may include positioning a camera behind the second calibration target such that it observes the first calibration target through the aperture defined in the second calibration target.

At block 806, the method 800 may include capturing a calibration image using the camera.

At block 808, the method 800 may include characterizing, based on the calibration image, an intrinsic distortion of the camera.

In some embodiments of block 808, characterizing the intrinsic distortion of the camera may include using the iterated reflections to determine a vanishing point within the calibration image.

In some embodiments of block 808, characterizing the intrinsic distortion of the camera may include determining an angle of the camera relative to the first mirror or relative to at least one of the one or more second mirrors.

Figure 8B:
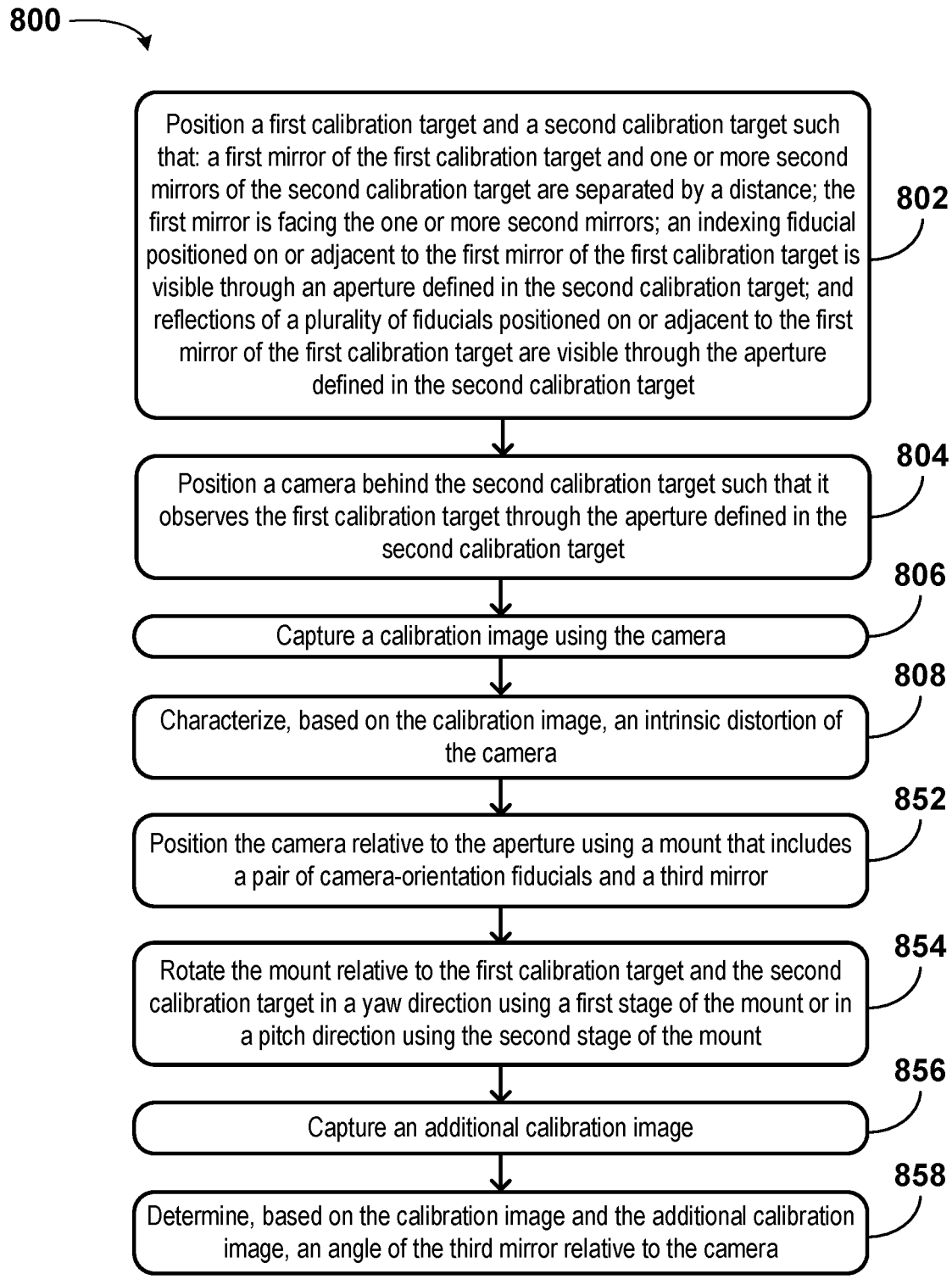
FIG. 8B is a flow chart illustration of a method, according to example embodiments.
Figure 8C:
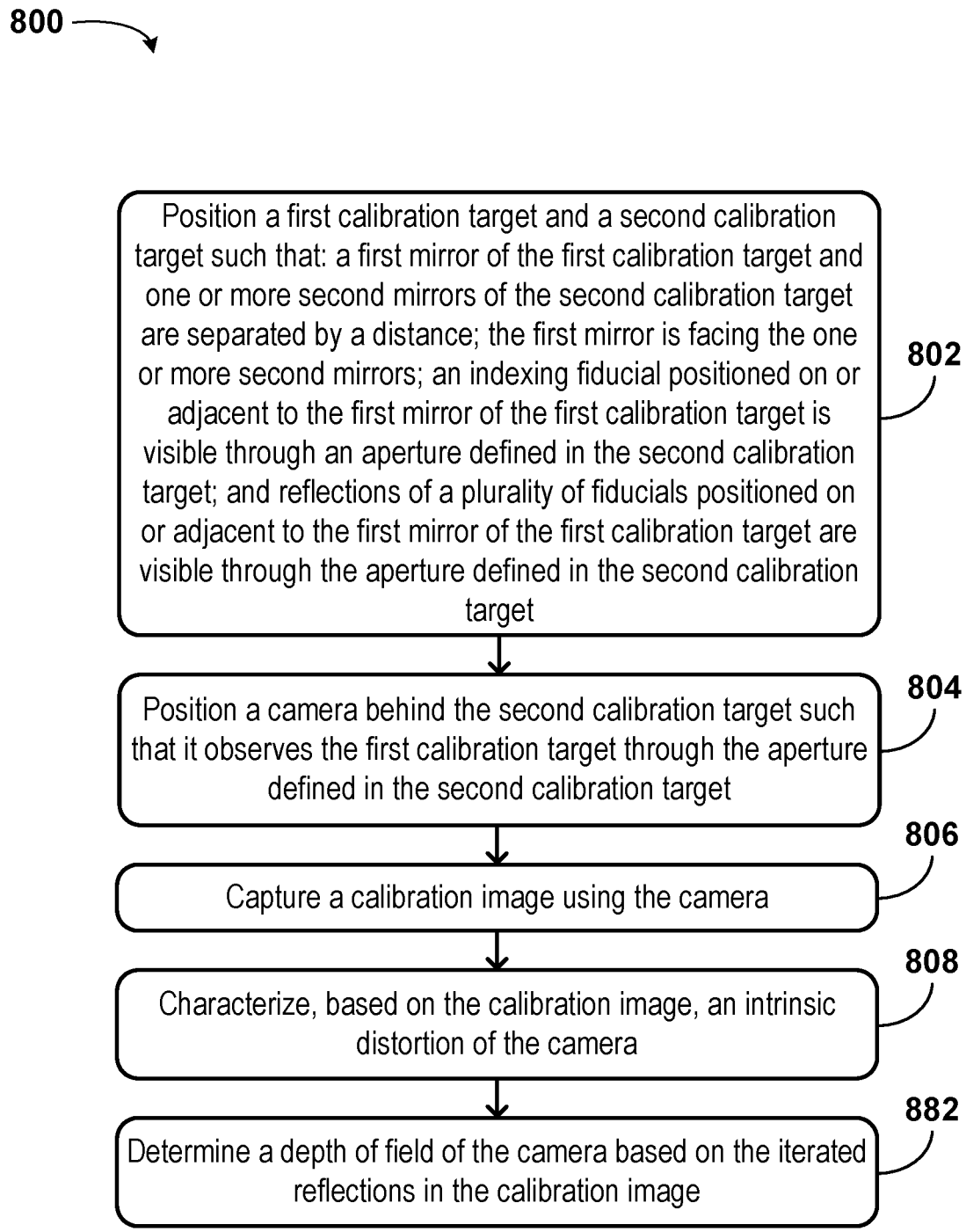
FIG. 8C is a flow chart illustration of a method, according to example embodiments.
Figure 8D:
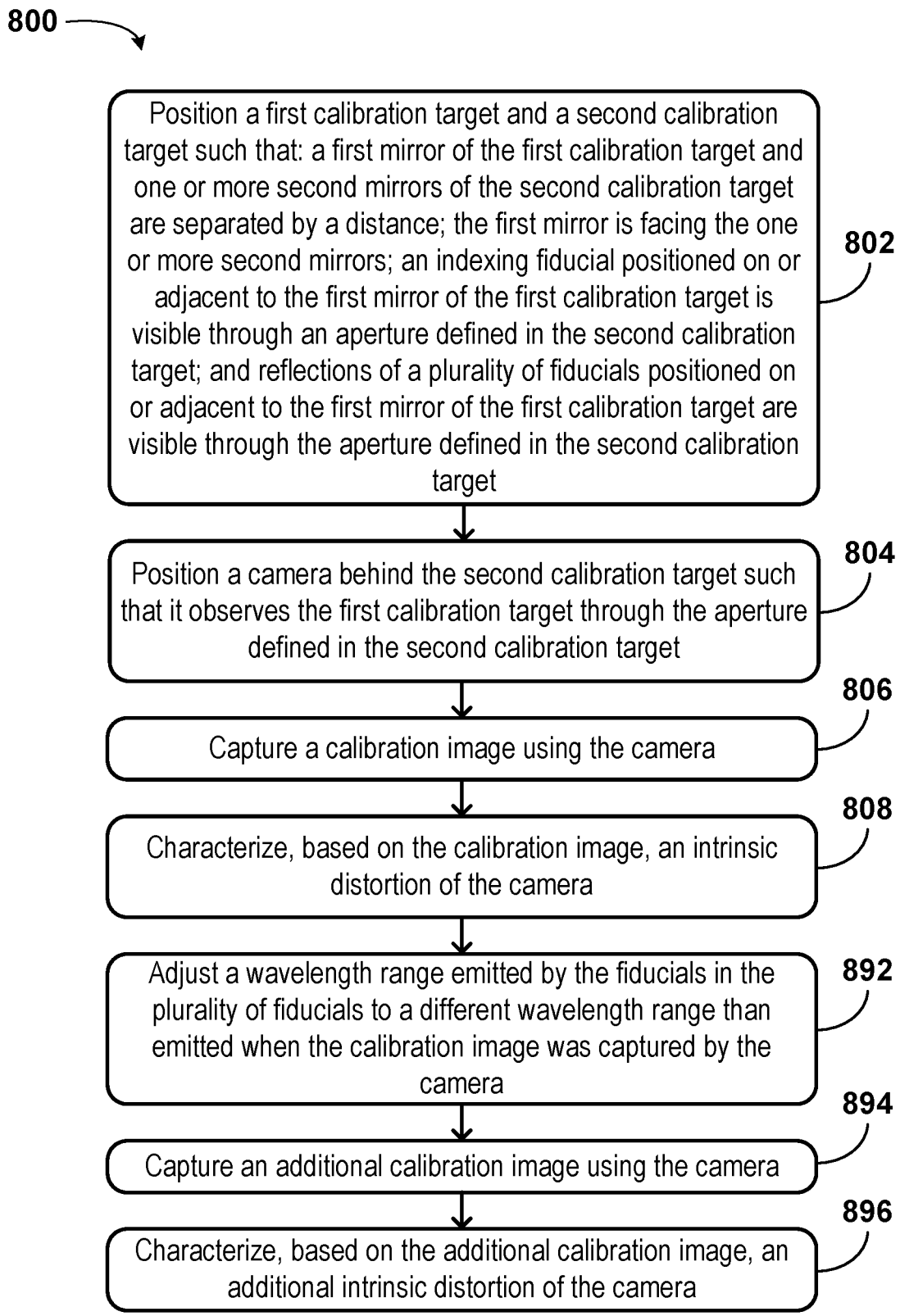
FIG. 8D is a flow chart illustration of a method, according to example embodiments.

In some embodiments, the method 800 may include additional blocks, as illustrated in FIGS. 8B-8D, for example.

For example, as illustrated in FIG. 8B, at block 852, the method 800 may include positioning the camera relative to the aperture using a mount that includes a pair of camera-orientation fiducials and a third mirror. Determining the angle of the camera relative to the first mirror may include identifying the pair of camera-orientation fiducials within the calibration image. The pair of camera-orientation fiducials is identified based on reflections from the first mirror and the third mirror.

In addition, at block 854, the method 800 may include rotating the mount relative to the first calibration target and the second target in a yaw direction using a first stage of the mount or in a pitch direction using a second stage of the mount.

Further, at block 856, the method 800 may include capturing an additional calibration image.

Even further, at block 858, the method 800 may include determining, based on the calibration image and the additional calibration image, an angle of the third mirror relative to the camera.

In some embodiments, as illustrated in FIG. 8C, at block 882, the method 800 may determining a depth of field of the camera based on the iterated reflections in the calibration image.

In some embodiments, as illustrated in FIG. 8D, at block 892, the method 800 may adjusting a wavelength range emitted by the fiducials in the plurality of fiducials to a different wavelength range than emitted when the calibration image was captured by the camera. The intrinsic distortion of the camera may include an intrinsic distortion for a first channel of the camera.

Further, at block 894, the method 800 may include capturing an additional calibration image using the camera.

In addition, at block 896, the method 800 may include characterizing, based on the additional calibration image, an additional intrinsic distortion of the camera. The additional intrinsic distortion of the camera may include an intrinsic distortion of a second channel of the camera.

The method 800 of FIG. 8, or any of the calibration techniques described herein, may be performed at various times within the life cycle of a camera (e.g., a camera used in computer vision). For example, the method 800 and/or other calibration techniques described herein may be performed after fabrication/assembly of the camera (e.g., in order to validate the fabrication process and/or account for mechanical tolerances present within the fabrication process). Alternatively, the calibration techniques described herein may be performed at predetermined intervals during a period when the camera is used for computer vision (e.g., every day, every week, every month, every year, etc.). For example, if the camera is used for object detection and avoidance within an autonomous vehicle, the calibration may be performed after the camera is assembled, once the camera is positioned on the autonomous vehicle, each time the camera is navigated to a service station and/or parking garage, etc. Still further, the calibration techniques described herein may be performed in response to a detection of one or more errors within the camera or within a computer vision system employing the camera. For example, if a different system on an autonomous vehicle (e.g., LIDAR system) detects a different position for a given object in a surrounding environment than is detected for the same object by the camera, the calibration techniques described herein may be performed to verify proper camera functionality.

IV. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

The computer-readable medium can also include non-transitory computer-readable media such as computer-readable media that store data for short periods of time like register memory and processor cache. The computer-readable media can further include non-transitory computer-readable media that store program code and/or data for longer periods of time. Thus, the computer-readable media may include secondary or persistent long term storage, like ROM, optical or magnetic disks, solid state drives, compact-disc read only memory (CD-ROM), for example. The computer-readable media can also be any other volatile or non-volatile storage systems. A computer-readable medium can be considered a computer-readable storage medium, for example, or a tangible storage device.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A calibration system comprising:
a first calibration target comprising:
a first mirror; and
a plurality of fiducials positioned on or adjacent to the first mirror; and
a second calibration target comprising one or more second mirrors and having an aperture defined therein,
wherein the first calibration target and the second calibration target are positioned such that:
the first mirror and the one or more second mirrors are separated by a distance;
the first mirror is facing the one or more second mirrors;
reflections of the plurality of fiducials are visible through the aperture defined in the second calibration target, wherein the reflections of the plurality of fiducials are iterated reflections resulting from at least one reflection by the one or more second mirrors and at least one reflection by the first mirror; and the first mirror and each of the one or more second mirrors are greater than 0.1° within parallel of one another but less than 10.0° within parallel of one another.

2. The calibration system of claim 1, wherein the plurality of fiducials comprises at least one linear fiducial and at least one point fiducial.

3. The calibration system of claim 1,
wherein the one or more second mirrors comprise only a single mirror, and
wherein the aperture is a hole defined within the single mirror.

4. The calibration system of claim 1,
wherein the one or more second mirrors comprise two mirrors separated from one another,
wherein the aperture is between the two mirrors, and
wherein the two mirrors separated from one another are positioned such that the two mirrors are within 5.0 cm of coplanar and are within 1.0° of parallel with one another.

5. The calibration system of claim 1,
wherein the fiducials in the plurality of fiducials emit light in a wavelength range, and
wherein the wavelength range includes at least one of a range of visible wavelengths or a range of infrared wavelengths.

6. The calibration system of claim 5, wherein the wavelength range is adjustable.

7. The calibration system of claim 1, wherein the first calibration target further comprises an indexing fiducial positioned on or adjacent to the first mirror, wherein the first calibration target and the second calibration target are positioned such that the indexing fiducial is visible through the aperture defined in the second calibration target, and wherein the indexing fiducial has an hourglass shape.

8. The calibration system of claim 1, further comprising a mount configured to position a camera relative to the aperture such that the camera is able to capture a calibration image of the iterated reflections of the plurality of fiducials through the aperture.

9. The calibration system of claim 8, wherein the mount comprises:
a first stage configured to rotate the camera in a yaw direction; and
a second stage configured to rotate the camera in a pitch direction.

10. The calibration system of claim 8, wherein the mount comprises a pair of camera-orientation fiducials such that, using the calibration image captured by the camera, an orientation of the camera relative to the first calibration target or the second calibration target can be determined.

11. The calibration system of claim 10, further comprising a third mirror affixed to the mount,
wherein the pair of camera-orientation fiducials comprise a first camera-orientation fiducial and a second camera-orientation fiducial,
wherein the third mirror is positioned on the mount adjacent to the camera,
wherein the first camera-orientation fiducial is positioned on the mount adjacent to the third mirror and opposite the camera, and
wherein the second camera-orientation fiducial is positioned on the mount adjacent to the camera and opposite the third mirror.

12. The calibration system of claim 11, wherein the first camera-orientation fiducial and the second camera-orientation fiducial are the same shape.

13. The calibration system of claim 11, wherein the calibration image captured by the camera is usable to determine an angle between the mount and the first mirror based on reflections of the pair of camera-orientation fiducials from the third mirror.

14. The calibration system of claim 1, wherein the plurality of fiducials comprises framing fiducials, and wherein the framing fiducials are usable to identify outer bounds of relevant areas of the iterated reflections.

15. The calibration system of claim 1, wherein the first calibration target further comprises an indexing fiducial positioned on or adjacent to the first mirror, wherein the first calibration target and the second calibration target are positioned such that the indexing fiducial is visible through the aperture defined in the second calibration target, and wherein the first calibration target and the second calibration target are positioned such that reflections of the indexing fiducial are not visible through the aperture defined in the second calibration target.

16. A method comprising:
positioning a first calibration target and a second calibration target such that:
a first mirror of the first calibration target and one or more second mirrors of the second calibration target are separated by a distance;
the first mirror is facing the one or more second mirrors;
reflections of a plurality of fiducials positioned on or adjacent to the first mirror of the first calibration target are visible through an aperture defined in the second calibration target, wherein the reflections of the plurality of fiducials are iterated reflections resulting from at least one reflection by the one or more second mirrors and at least one reflection by the first mirror; and
the first mirror and each of the one or more second mirrors are greater than 0.1° within parallel of one another but less than 10.0° within parallel of one another;
positioning a camera behind the second calibration target such that it observes the first calibration target through the aperture defined in the second calibration target;
capturing a calibration image using the camera; and
characterizing, based on the calibration image, an intrinsic distortion of the camera.

17. The method of claim 16, wherein characterizing the intrinsic distortion of the camera comprises using the iterated reflections to determine a vanishing point within the calibration image.

18. The method of claim 16, wherein characterizing the intrinsic distortion of the camera comprises determining an angle of the camera relative to the first mirror or relative to at least one of the one or more second mirrors.

19. The method of claim 18,
further comprising positioning the camera relative to the aperture using a mount comprising a pair of camera-orientation fiducials and a third mirror,
wherein determining the angle of the camera relative to the first mirror comprises identifying the pair of camera-orientation fiducials within the calibration image, and
wherein the pair of camera-orientation fiducials is identified based on reflections from the first mirror and the third mirror.

20. A non-transitory, computer-readable medium having instructions stored thereon, wherein the instructions, when executed by a processor, cause the processor to execute a method comprising:
- receiving a calibration image captured using a camera positioned behind a second calibration target to observe a first calibration target through an aperture defined in the second calibration target,
- wherein the first calibration target comprises:
  - a first mirror; and
  - a plurality of fiducials positioned on or adjacent to the first mirror,
  - wherein the second calibration target comprises one or more second mirrors, and
  - wherein the first calibration target and the second calibration target are positioned such that:
    - the first mirror and the one or more second mirrors are separated by a distance;
    - the first mirror is facing the one or more second mirrors;
    - reflections of the plurality of fiducials are visible through the aperture defined in the second calibration target, wherein the reflections of the plurality of fiducials are iterated reflections resulting from at least one reflection by the one or more second mirrors and at least one reflection by the first mirror; and
    - the first mirror and each of the one or more second mirrors are greater than 0.1° within parallel of one another but less than 10.0° within parallel of one another; and
- characterizing, based on the calibration image, an intrinsic distortion of the camera.

* * * * *